(12) United States Patent
Ogiso

(10) Patent No.: US 8,212,830 B2
(45) Date of Patent: Jul. 3, 2012

(54) IMAGE CONVERTING APPARATUS AND IMAGE CONVERTING METHOD

(75) Inventor: Toru Ogiso, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 1177 days.

(21) Appl. No.: 12/022,050

(22) Filed: Jan. 29, 2008

(65) Prior Publication Data

US 2008/0192060 A1 Aug. 14, 2008

(30) Foreign Application Priority Data

Feb. 13, 2007 (JP) ................................. 2007-032717

(51) Int. Cl.
*G06F 13/372* (2006.01)
*G06F 13/00* (2006.01)
*G06T 1/00* (2006.01)
*G09G 5/36* (2006.01)
*G09G 5/397* (2006.01)
*H04N 7/01* (2006.01)

(52) U.S. Cl. ........ 345/534; 345/522; 345/536; 345/537; 345/545; 345/546; 345/547; 348/443

(58) Field of Classification Search .................. 345/522, 345/530–551; 348/441, 443–444, 453–457, 348/459, 536–539, 547–548
See application file for complete search history.

(56) References Cited

U.S. PATENT DOCUMENTS

| 5,657,478 A * | 8/1997 | Recker et al. .................. 345/503 |
| 6,549,948 B1 | 4/2003 | Sasaki et al. |
| 2001/0028790 A1 * | 10/2001 | Numata ......................... 386/111 |
| 2005/0237427 A1 * | 10/2005 | Kume et al. ................... 348/443 |
| 2006/0050075 A1 * | 3/2006 | Gong et al. .................... 345/546 |
| 2006/0061600 A1 | 3/2006 | Beuker et al. |
| 2006/0256236 A1 * | 11/2006 | Kume et al. ................... 348/441 |

FOREIGN PATENT DOCUMENTS

| EP | 1244091 A2 | 9/2002 |
| JP | 2002-006818 | 1/2002 |

OTHER PUBLICATIONS

Japanese Patent Office, Notification of Reason(s) for Refusal, issued in corresponding Japanese Application No. 2007-032717, Jan. 27, 2009, 4 pages and 3-page English language translation.
European Patent Office, "European Search Report", issued in corresponding European Application No. 07024117.9, Jul. 3, 2009, 7 pages.

* cited by examiner

*Primary Examiner* — Xiao M. Wu
*Assistant Examiner* — Andrew Shin
(74) *Attorney, Agent, or Firm* — Fitch, Even, Tabin & Flannery, LLP

(57) ABSTRACT

An image converter converts an image rendered at a given vertical synchronous frequency into an image compatible with the specification of a display. A frame memory holds the image converted by the image converter by switching a plurality of buffers. A display controller selects one of the buffers in accordance with the vertical synchronous frequency of the display, and scans out the image from the frame memory accordingly. A switch instruction issuing unit issues a frame buffer switch instruction for designating a frame buffer to scan out from subsequently, in synchronization with the vertical synchronous frequency of the display, instead of immediately after the execution of an image converting process by the image converter.

16 Claims, 13 Drawing Sheets

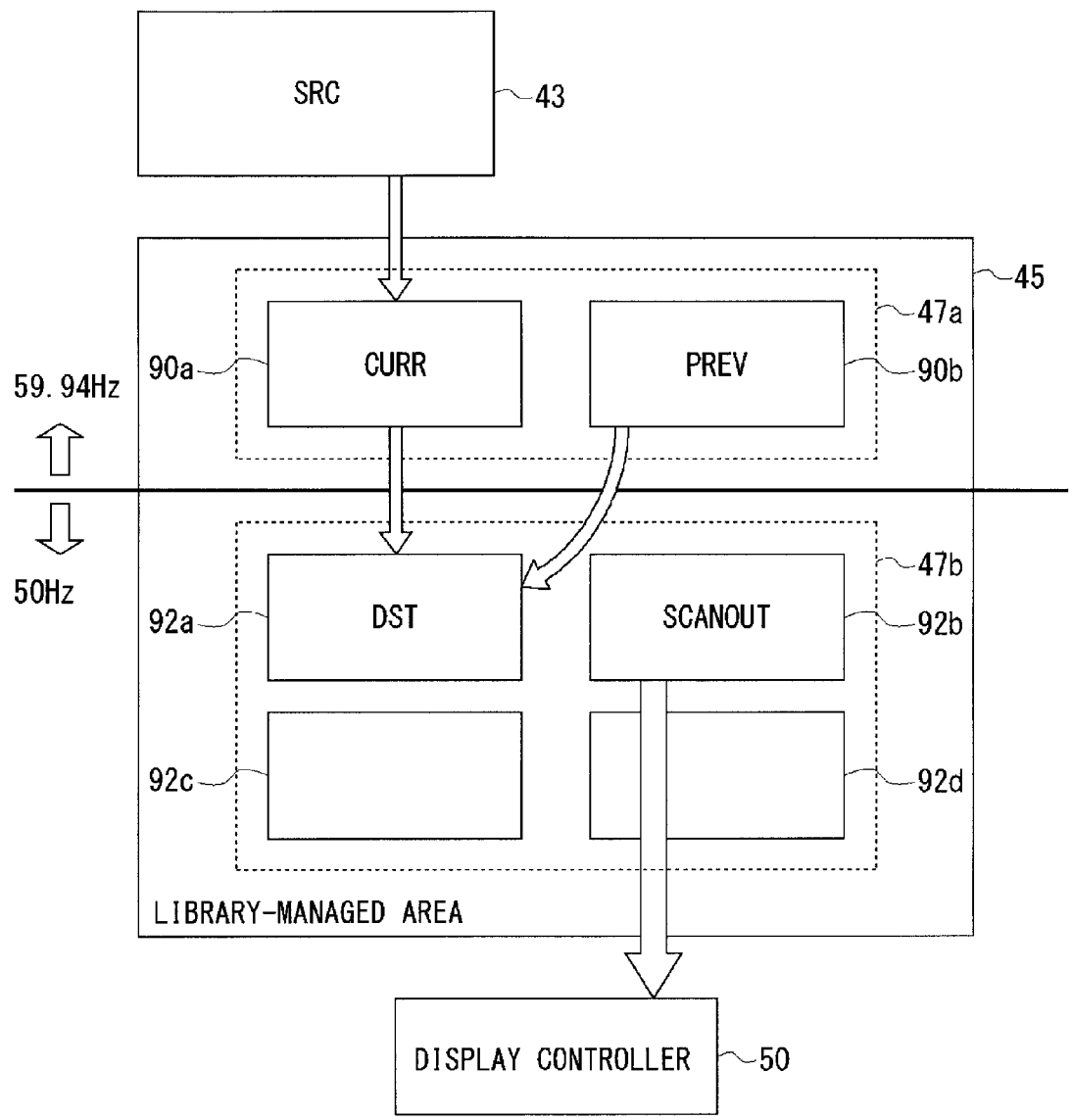

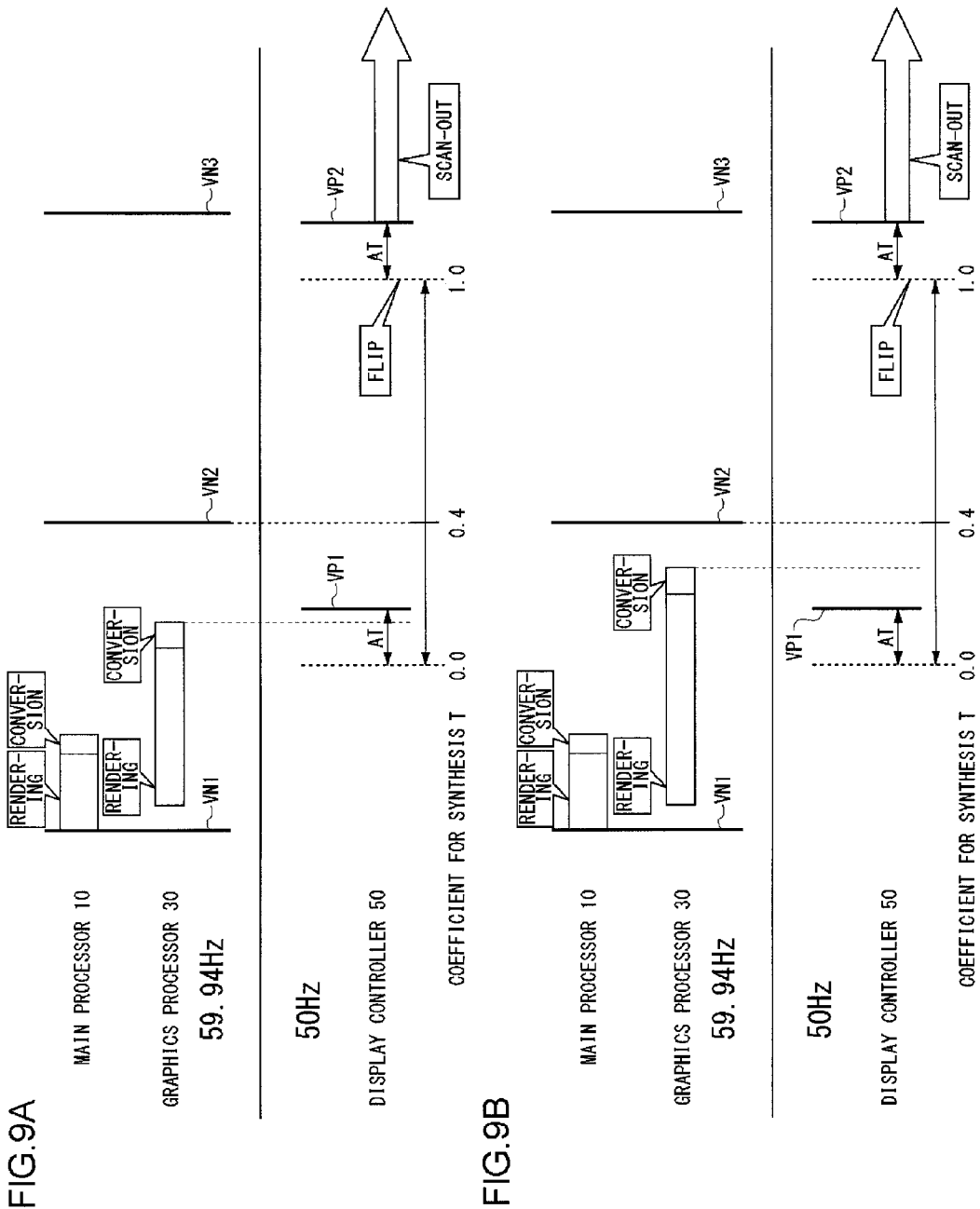

IMAGE CONVERTING APPARATUS AND IMAGE CONVERTING METHOD

CROSS REFERENCE TO RELATED APPLICATION

The present application claims priority from Japanese Application No. JP2007-032717, filed Feb. 13, 2007, the disclosure of which is hereby incorporated by reference herein in its entirety.

BACKGROUND OF THE INVENTION

1. Field of the Invention

The present invention relates to a rendering technology and, more particularly, to a rendering technology for generating image adapted for a display device.

2. Description of the Related Art

With improvement in the technology for fabricating a thin display such as a liquid crystal display and a plasma display, and the reduction in prices, an extensive variety of display devices are currently available around us. Display devices display high-quality images played back by a DVD player or moving images generated by computer graphics.

In order to display image data output from a computer or a DVD player on a display device, a display controller is necessary which converts an image signal into a format compatible with the specification of a display device, by converting the horizontal frequency or the vertical frequency of an image signal.

In order to output an image to a display of the NTSC/PAL/SECAM television system, the image should be output to adapt to the vertical synchronous frequency of the NTSC/PAL/SECAM system. This requires conversion of the resolution and frame rate of an image rendered by a graphics processor.

The specification (e.g., frame rate and resolution) of an image signal that can be displayed varies from device to device. For conversion of an image signal by a display controller in adaptation to the specification of destination display devices, various converters are necessary. Disadvantageously, this results in an increase in circuit scale and fabrication cost. Configuring a converter by hardware for shipping results in limited flexibility and expandability because it will be impossible to address new display technologies and standards efficiently.

Further, a timing difference between a vertical synchronizing signal concurrent with the rendering of an image by the graphics processor and a vertical synchronizing signal concurrent with the display of the image on a display device may exercise unpredicted influence on the frame rate conversion of the image, making it difficult to maintain the quality of the image displayed on the display device.

SUMMARY OF THE INVENTION

In this background, a general purpose of the present invention is to provide an image conversion technology capable of converting an image rendered by a graphics processor into an image compatible with the specification of a display device.

In order to achieve the purpose, the image converting apparatus according to at least one embodiment of the present invention comprises: a first frame memory which holds an image rendered by a graphics processor at a given vertical synchronous frequency; an image converter which converts the image held in the first frame memory into an image compatible with the specification of a display; a second frame memory which holds the image converted by the image converter by switching a plurality of frame buffers, one of the frame buffers being selected in accordance with the vertical synchronous frequency of the display to scan out the image; and a switch instruction issuing unit which issues a frame buffer switch instruction for designating a frame buffer to scan out from subsequently, in synchronization with the vertical synchronous frequency of the display, instead of immediately after the execution of an image converting process by the image converter Another embodiment of the present invention also relates to an image converting apparatus. The apparatus is for converting an image rendered by a graphics processor into an image compatible with the television system, and comprises: a first frame memory which holds an image rendered by the graphics processor at a given vertical synchronous frequency; an image converter which converts the image held in the first frame memory into an image compatible with a television system to output to; a second frame memory which holds the image converted by the image converter by switching a plurality of frame buffers, one of the frame buffers being selected in accordance with the vertical synchronous frequency of a television display to output to, so as to scan out the image; and a switch instruction issuing unit which issues a frame buffer switch instruction for designating a frame buffer to scan out from subsequently, in synchronization with the vertical synchronous frequency of the television display to output to, instead of immediately after the execution of an image converting process by the image converter.

Another embodiment of the present invention relates to an image converting method. The method comprises: holding an image rendered by a graphics processor at a given vertical synchronous frequency in a first frame memory; converting an image held in the first frame memory into an image compatible with the specification of a display; holding the image converted by the converting in a second frame memory provided with a plurality of switchable frame buffers, one of the frame buffers being selected in accordance with the vertical synchronous frequency of the display to scan out the image; and issuing a frame buffer switch instruction for designating a frame buffer to scan out from subsequently, in synchronization with the vertical synchronous frequency of the display, instead of immediately after the execution of an image converting process in the image converting.

Another embodiment of the present invention relates to a computer readable storage medium storing a computer program executable by a processor based system. The computer program comprises: a module which holds an image rendered by a graphics processor at a given vertical synchronous frequency in a first frame memory; a module which converts an image held in the first frame memory into an image compatible with the specification of a display; a module which holds the image converted by the image converting module in a second frame memory provided with a plurality of switchable frame buffers, one of the frame buffers being selected in accordance with the vertical synchronous frequency of the display to scan out the image; and a module which issues a frame buffer switch instruction for designating a frame buffer to scan out from, in synchronization with the vertical synchronous frequency of the display, instead of immediately after the execution of an image converting process by the image converting module.

Optional combinations of the aforementioned constituting elements, and implementations of the invention in the form of methods, apparatuses, systems, computer programs, data structures, and recording mediums may also be practiced as additional modes of the present invention.

BRIEF DESCRIPTION OF THE DRAWINGS

FIG. 5A shows the operation of the image converter of FIG. 2 in the frame interpolation mode.

FIGS. 9A and 9B show the advantage of ensuring that a flip command is not executed immediately after an image conversion process but is separated therefrom.

DETAILED DESCRIPTION

The invention will now be described by reference to the preferred embodiments. This does not intend to limit the scope of the present invention, but to exemplify the invention.

Figure 1:
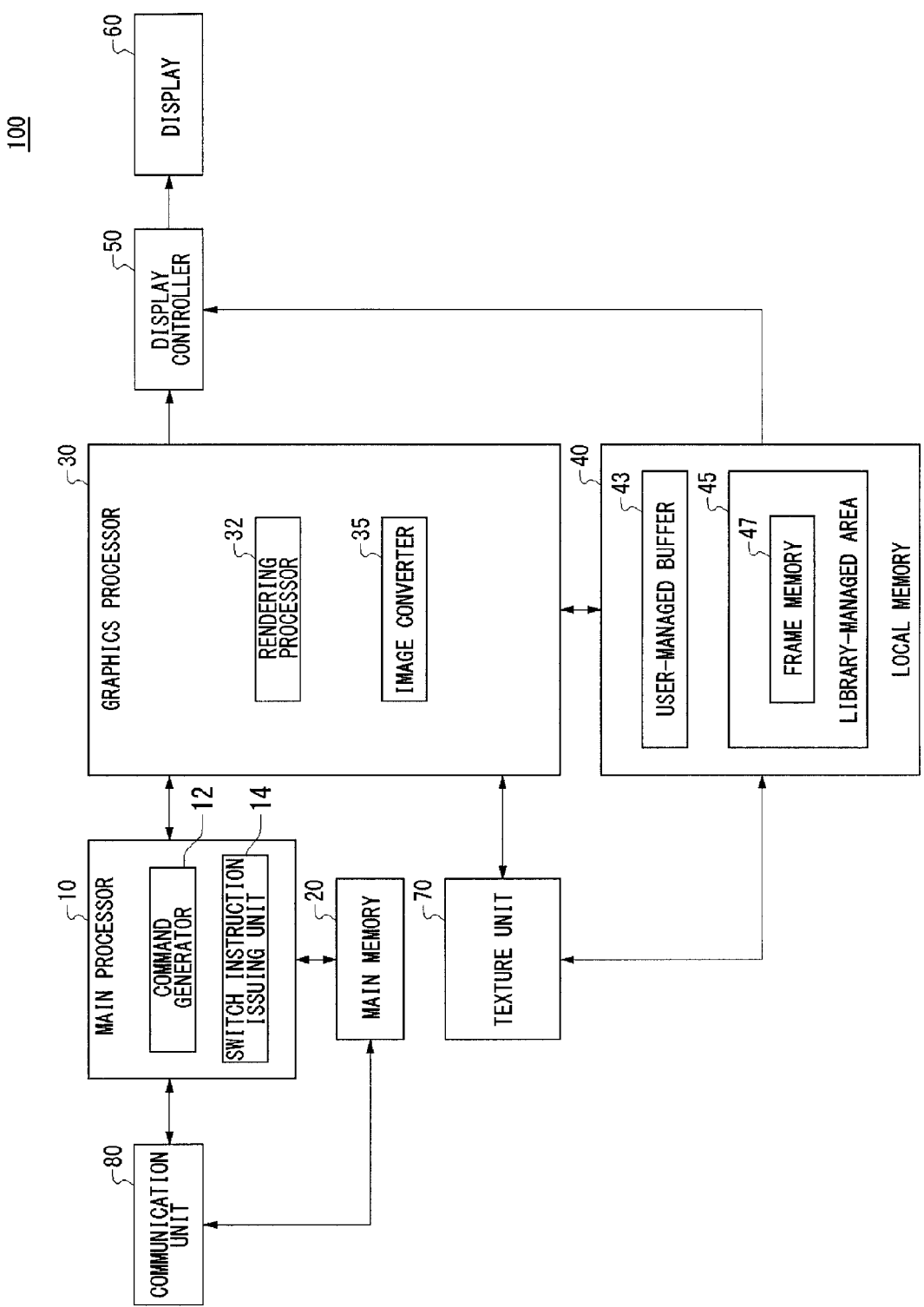
FIG. 1 shows the structure of a rendering processor according to an embodiment.

FIG. 1 shows the structure of a rendering apparatus 100 according to an embodiment. A rendering apparatus 100 performs a rendering process to generate rendering data to be displayed on a screen, based on 3D model information of an object to be rendered (hereinafter, simply referred to as an "object"). The figure depicts a block diagram highlighting the functions. These functional blocks can be realized in various forms by hardware only, software only, or a combination thereof.

The rendering apparatus 100 includes a main processor 10, a main memory 20, a graphics processor 30, a local memory 40, a display controller 50, a display 60, a texture unit 70, and a communication unit 80. These components are connected to a bus (not shown).

The main memory 20 is a storage area primarily used by the main processor 10, and stores vertex data of an object and control parameters.

The main processor 10 is for geometric computation of an object, and generates a rendering command directing the graphics processor 30 to render an object.

The main processor 10 is provided with the functions of a command generator 12 and a switch instruction issuing unit 14. The command generator 12 generates a rendering command and stores the command in a command buffer. The rendering command stored in the command buffer is read out by the graphics processor 30 and executed. The image rendered by the graphics processor 30 is stored in a frame memory 47. The switch instruction issuing unit 14 issues a switch instruction for setting the time to switch multiple buffers in the frame memory 47 and for designating a buffer to switch to.

The local memory 40 is a storage area primarily used by the graphics processor 30, and stores a shader program implementing a rendering algorithm and texture data to be mapped to an object. The local memory 40 is provided with a frame buffer for holding an intermediate result or an ultimate result of rendering.

The frame buffer provided in the local memory 40 comprises a user-managed buffer 43 and a library-managed area 45. The user-managed buffer 43 is a user area used by an application, and the library-managed area 45 is an area managed by a graphics library.

The graphics processor 30 renders an object to generate rendering data, and stores the rendering data in the local memory 40. The graphics processor 30 is provided with the functions of a rendering processor 32 and an image converter 35. These functions are provided as part of the function of a programmable shader.

The rendering processor 32 subjects an object to various rendering processes such as shading and texture mapping, in accordance with a rendering command issued from the main processor 10. The processor 32 writes the rendering data in the user-managed buffer 43 in the local memory 40.

For texture mapping, the rendering processor 32 uses the texture mapping function of the texture unit 70. The texture unit 70 reads out the texture data stored in the local memory 40; determines the values of a texture to be mapped to the surface of an object by, for example, bilinear interpolation; and supplies the values to the rendering processor 32.

The image converter 35 is a software module for converting the rendering data generated by the rendering processor 32 into display image data compatible with the specification of the display 60. The software module is supplied to a programmer in the form of an image conversion library for use in the graphics processor 30.

The image converter 35 reads out the rendering data generated by the rendering processor 32 from the user-managed buffer 43, subjects the data to a filtering process, and converts the data into display image data compatible with the specification of the display 60. Examples of filtering include resolution conversion, color space conversion, gamma correction, downsampling, temporal filtering, antialiasing and motion blur.

The resolution conversion is performed to address a difference in the aspect ratio between the displays 60 to output to, or to convert from and into a standard definition (SD) image and a high definition (HD) image. The resolution conversion involves pixel interpolation. The image converter 35 determines pixel values necessary for the resolution conversion by interpolation from surrounding pixel values, by taking advantage of the bilinear interpolation function of the texture unit 70. More specifically, the texture unit 70 samples an image before the resolution conversion, capturing the image as texture, and generates pixel data for the image subjected to resolution conversion by subjecting the pixels of the captured texture to bilinear interpolation.

Temporal filtering is defined as filtering images in the temporal direction, by dropping an image frame, or by synthesizing two frame images to generate a temporally interpolated frame image. Temporal filtering is employed to convert the frame rate, when the vertical synchronous frequency assumed by the graphics processor 30 in rendering and the actual vertical synchronous frequency of the display 60 do not match.

For image conversion, the image converter 35 uses the frame memory 47 provided in the library-managed area 45 in the local memory 40, and writes the display image data subjected to conversion in the frame memory 47.

The frame memory 47 provided in the library-managed area 45 comprises multiple buffers such as double buffers or triple buffers so that the writing and reading of image display data can be performed independently. Display image data for a subsequent frame is written in a buffer different from the buffer being read by the display controller 50. The display controller 50 successively switches the multiple buffers in the frame memory 47 and scans the buffers accordingly, in synchronization with the vertical synchronous frequency (also referred to as "refresh rate") of the display 60.

The display controller 50 switches the multiple buffers in the frame memory 47 in accordance with a switch instruction issued by the switch instruction issuing unit 14, and scans the buffers accordingly so as to read out display image data.

The operation for scanning the frame memory 47 performed by the display controller 50 will now be described in further detail. The display controller 50 reads out pixel data of the display image data line by line from the frame memory 47. The display controller 50 scans from the pixel at the top left corner of the frame memory 47 and proceed in the horizontal direction, so as to read out pixel data in the first horizontal row. The controller 50 then moves vertically by one pixel, so as to read out the pixels in the next horizontal row. When the line of pixels at the bottom has been scanned, the line of pixels at the top row are scanned again.

Since the frame memory 47 comprises multiple buffers, the display controller 50 switches frame buffers in which to scan display image data, in accordance with a switch signal generated in synchronization with a vertical synchronizing signal (VSYNC) for the display 60. The display controller 50 is timed by the vertical synchronizing signal to switch from the first frame buffer, which has been scanned so far, to the second buffer, so as to read out the display image data from the second buffer.

The display controller 50 converts the display image data, represented by RGB color values and read out from the frame memory 47, into an image signal of a format compatible with the display 60. The controller 50 supplies the signal to the display 60.

The display 60 may be a computer display such as a CRT display or a liquid crystal display for a computer. Alternatively, the display 60 may be a television display such as a CRT display, a liquid crystal display or a plasma display for a television set.

The graphics processor 30 and the main processor 10 are connected to each other via an input and output interface (not shown). The graphics processor 30 is capable of accessing the main memory 20 via the input and output interface. Likewise, the main processor 10 is capable of accessing the local memory 40 via the input and output interface.

The communication unit 80 is capable of transmitting and receiving data via a network in accordance with an instruction from the main processor 10. The data transmitted and received by the communication unit 80 is held in the main memory 20.

Figure 2:
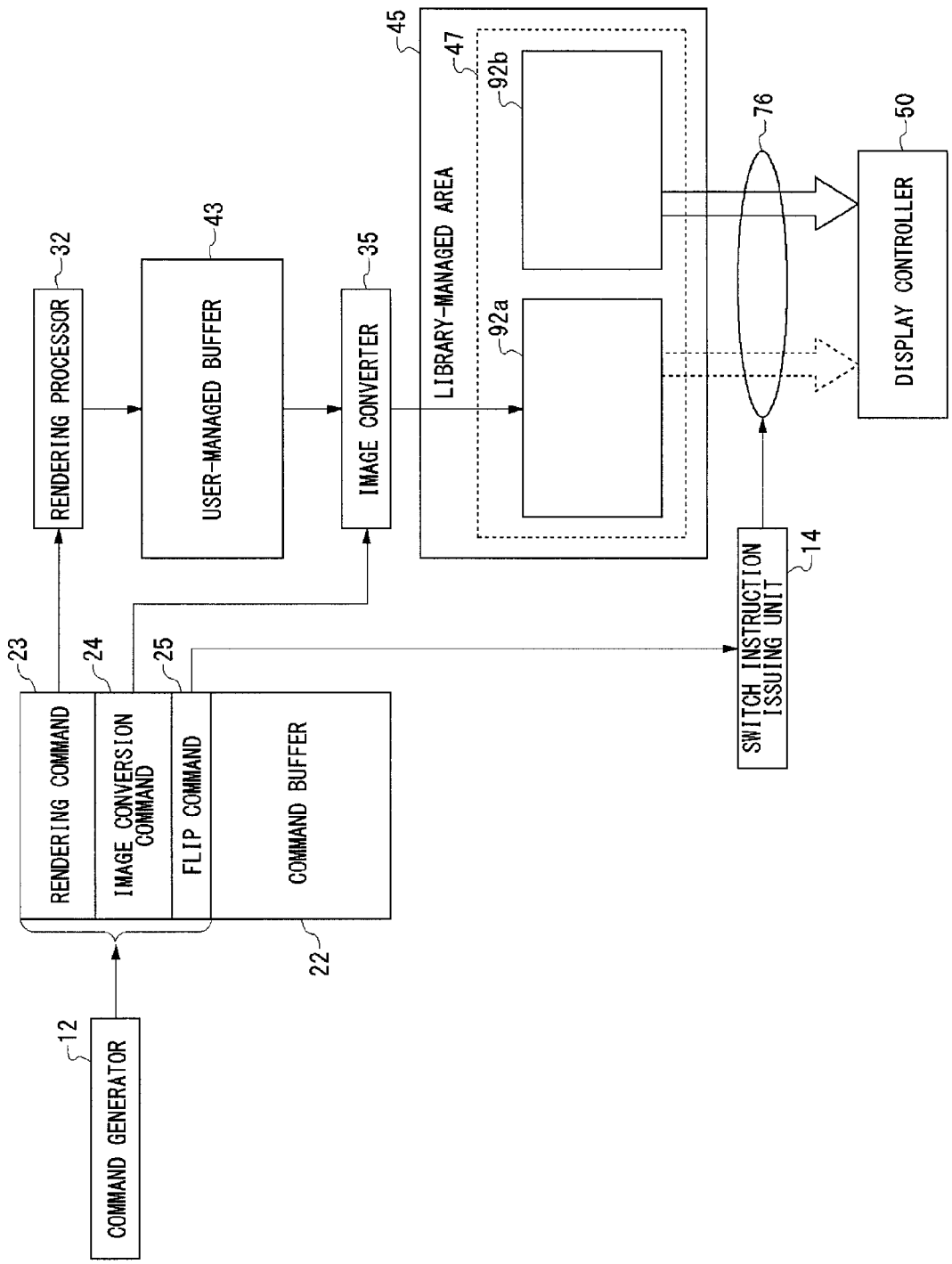
FIG. 2 shows the structure of the graphics processor involved in image conversion.

FIG. 2 shows the structure of the graphics processor 30 involved in an image conversion process.

The specifics of the operation of the image conversion process will be described by referring to the figure.

The command generator 12 of the main processor 10 generates a rendering command 23 for rendering an object, and stores the command in a command buffer 22. A rendering command 23 is successively read out by the rendering processor 32 of the graphics processor 30 and executed. The rendering data is written in the user-managed buffer 43.

In generating a rendering command 23, the command generator 12 generates an image conversion command 24 which designates a function and a parameter for a filtering processes such as resolution conversion and frame rate conversion; and a flip command 25 which designates a buffer, in the frame memory comprising multiple buffers, to read from. The generator 12 appends the image conversion command 24 and the flip command 25 to the rendering command 23 before storing the commands in the command buffer 22.

The image converter 35 reads out the image conversion command 24 from the command buffer 22, subjects the image held in the user-managed buffer 43 to various filtering processes. The converter 35 writes the image subjected to conversion in the frame memory 47 provided in the library-managed area 45 and comprising doubles buffers 92 and 92b. The switch instruction issuing unit 14 reads the flip command 25 from the command buffer 22 and executes the command, and provides a switcher 76 with a switch signal for switching buffers to read from. The display controller 50 scans out the image from the read buffer selected by the switcher 76.

When the filtering processes by the image converter 35 include a frame rate conversion process, not only the current frame but also past frames should be held in the frame memory 47. For this purpose, the frame memory 47 is divided into two areas for use: the first frame memory for holding at least two frame images subjected to a filtering process (e.g., resolution conversion) other than frame rate conversion; and the second frame memory for holding frame images subjected to frame rate conversion that uses the at least two frame images held in the first frame memory.

While the flip command 25 is illustrated as being queued in the command buffer 22, as will be ordinarily practiced, the embodiment employs a method of calling back a function for causing a driver to perform the flip operation, instead of queuing the flip command 25 in the command buffer 22. The switch instruction issuing unit 14 of the main processor 10 ensures that the issuance of the flip command 25 is synchronized with the vertical synchronizing signal for the display 60, instead of causing it to occur immediately after the image conversion process by the image converter 35. The flip function is automatically called by a timer interrupt.

The frame rate conversion process by the image converter 35 proceeds in one of the following five modes. Firstly, three basic modes will be described.

(1) Frame Rate Non-Conversion Mode

This is a mode in which the frame rate of images rendered by the rendering processor 32 at a given vertical synchronous frequency remains unchanged.

(2) Dropped Frame Mode

This is a mode in which frames rendered by the rendering processor 32 at a given vertical synchronous frequency are decimated.

(3) Frame Interpolation Mode

This is a mode in which two images rendered by the rendering processor 32 at a given vertical synchronous frequency are synthesized with a given coefficient for synthesis.

In addition to these three basic modes, the following two expanded modes are available.

(4) Slow-Operation/Dropped Frame Mode

A mode in which frame interpolation is performed in a normal situation when the rendering is completed within one period (1VSYNC) of vertical synchronous frequency, and frames are dropped in a slow operation when it takes two periods (2VSYNC) of vertical synchronous frequency for rendering.

(5) Variable Mixture Mode

This is a mode in which the frame interpolation mode and the virtual dropped frame mode are mixed by adjusting the coefficient for synthesis in the frame interpolation.

The different modes of operation for frame rate conversion performed by the image converter 35 will be described with reference to the drawings. Hereinafter, the description assumes that the image converter 35 performs resolution conversion and frame rate conversion. However, the description applies equally to cases where filtering other than resolution conversion is performed.

Figure 3B:
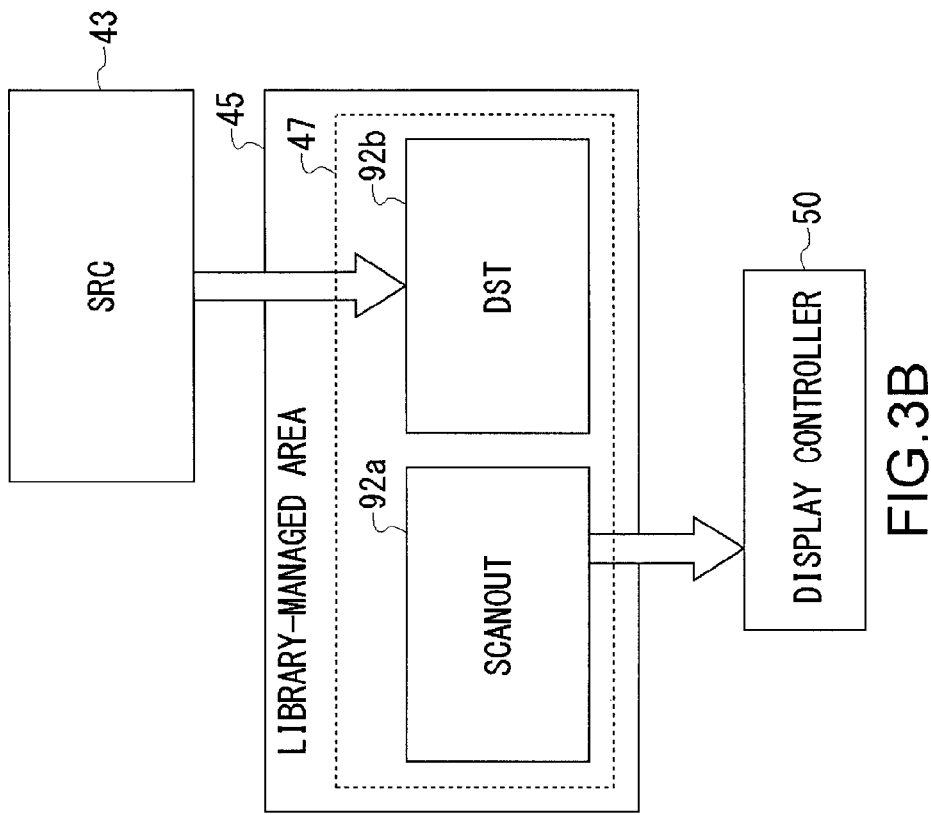
FIGS. 3A and 3B show the operation of an image converter of FIG. 2 operating in the frame rate non-conversion mode.
Figure 3A:
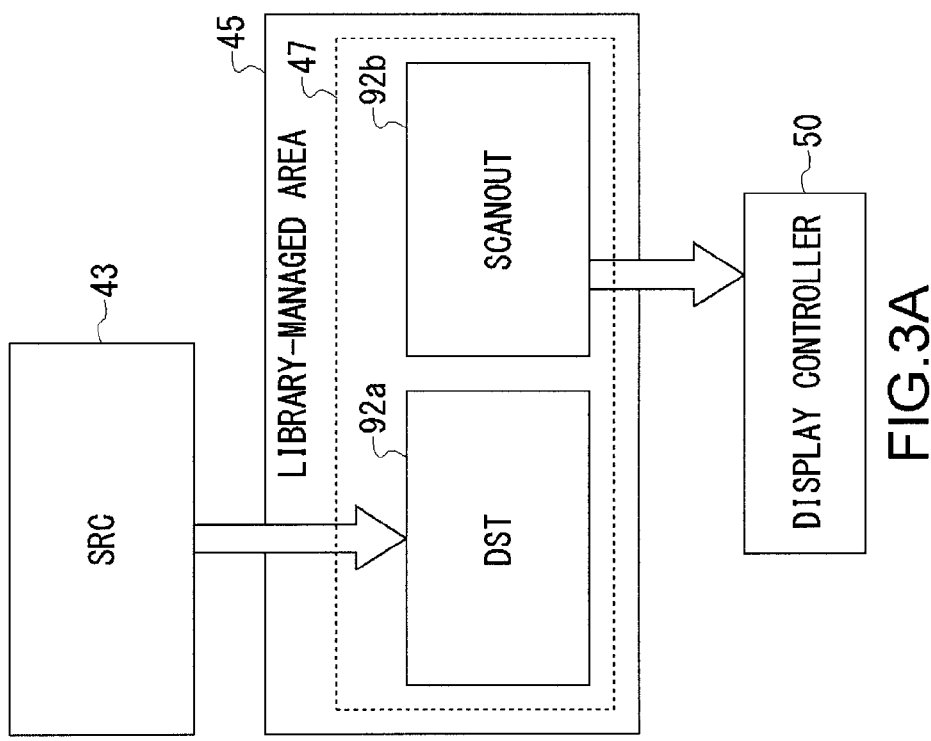

FIGS. 3A and 3B show the operation of the image converter 35 in the frame rate non-conversion mode.

The image rendered by the rendering processor 32 is held in the user-managed buffer 43. The image converter 35 subjects a source image SRC held in the user-managed buffer 43 to resolution conversion and writes the converted image DST in the frame memory 47 of the library-managed area 45. The frame memory 47 comprises double buffers 92a and 92b. When an odd frame is processed, the image converter 35 writes the converted image DST in the left buffer 92a. Meanwhile, the display controller 50 scans out an image SCANOUT to be displayed from the right buffer 92b (FIG. 3A). When an even frame is processed, the image converter 35 writes the converted image DST in the right buffer 92b. Meanwhile, the display controller 50 scans out an image SCANOUT to be displayed from the left buffer 92a (FIG. 3B).

In the frame rate non-conversion mode, the frame rate of the image rendered at the vertical synchronous frequency for the graphics processor 30 is output to the display 60 without changing its frame rate. When the graphics processor 30 renders at the vertical synchronous frequency of the NTSC system and the display 60 is an NTSC TV display, or when the graphics processor 30 renders at the vertical synchronous frequency of the PAL system and the display 60 is a PAL TV display, the image converter 35 may be operated in the frame rate non-conversion mode.

In the frame rate non-conversion mode, the frame memory 47 may only comprise a total of two buffers: one for writing and one for reading.

Figure 4:
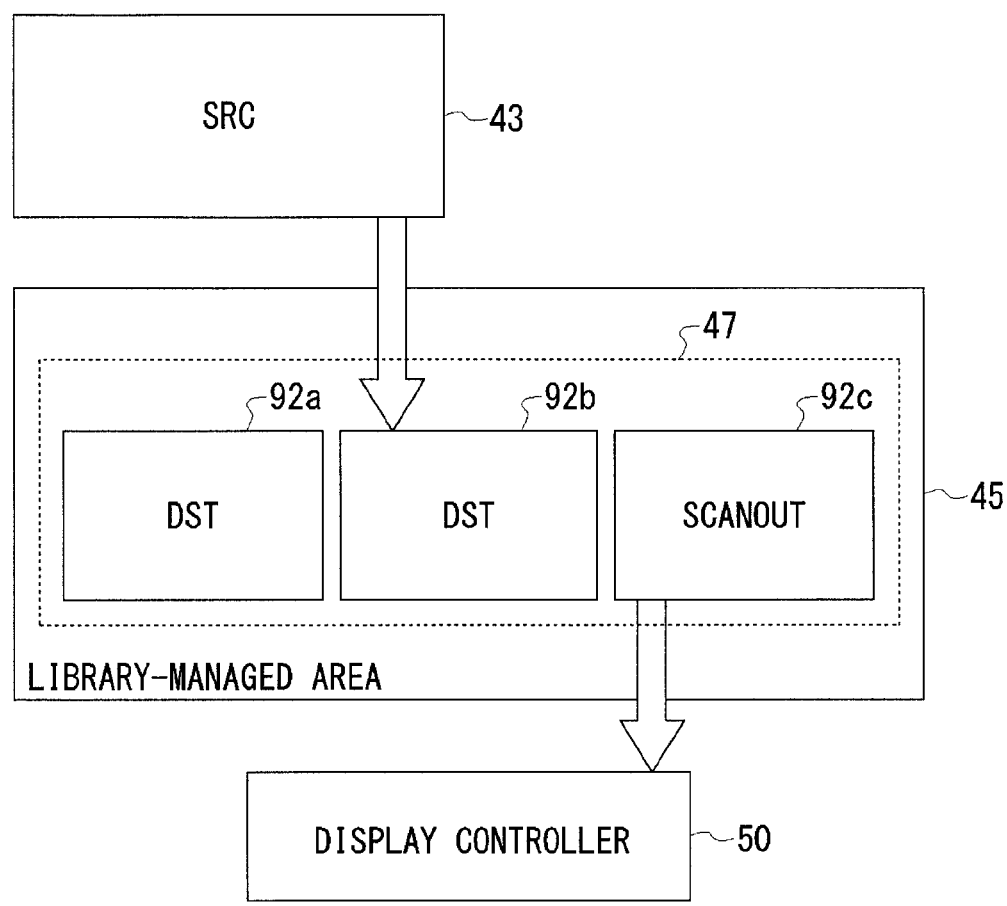
FIG. 4 shows the operation of the image converter of FIG. 2 in the dropped frame mode.

FIG. 4 shows the operation of the image converter 35 in the dropped frame mode. In the dropped frame mode, the frame rate of images rendered by the rendering processor 32 is higher than the frame rate of the display 60 so that the frame images rendered by the rendering processor 32 are decimated. The frame memory 47, provided in the library-managed area 45, comprises three buffers 92a, 92b and 92c. The image converter 35 has completed writing the converted image DST in the left buffer 92a. The converter 35 is now in the process of writing an image, obtained by subjecting a source image SRC held in the user-managed buffer 43 to resolution conversion, in the center buffer. Concurrently, the display controller 50 scans out an image SCANOUT to be displayed from the right buffer 92c.

The image converter 35 decimates frames so as to cancel a difference between the frame rate of the image rendered by the rendering processor 32 and the frame rate of the image displayed on the display 60. For example, the display controller 50 decimates the frame held in the left buffer 92a, by reading an image to be scanned out from the center buffer 92b instead of the left buffer 92a, in accordance with a switch instruction issued by the switch instruction issuing unit 14.

As described, in the dropped frame mode, the frame rate of an image is converted into the level compatible with the vertical synchronous frequency for the display 60, by intentionally decimating frames of the image rendered at the vertical synchronous frequency for the graphics processor 30. For example, given that the graphics processor 30 renders at the vertical synchronous frequency of 59.94 Hz of the NTSC system, and the destination display 60 operates at the vertical synchronous frequency of 50 Hz of the PAL system, the frame rate of the image can converted from 59.94 Hz into 50 Hz by dropping one out of about six frames.

In the dropped frame mode, the vertical synchronous frequency for rendering is higher than the vertical synchronous frequency for display, with the result that the writing of a frame and the reading of a frame are not synchronized. Because the writing of a frame precedes the reading, it is necessary to provide write buffers for two frames. Accordingly, the frame memory 47 should comprise a total of three buffers including two buffers for writing and one buffer for reading.

The dropped frame mode is advantageous in that the frame rate is converted in a simplified manner. One disadvantage is that moving images may look discontinuous.

Figure 5B:
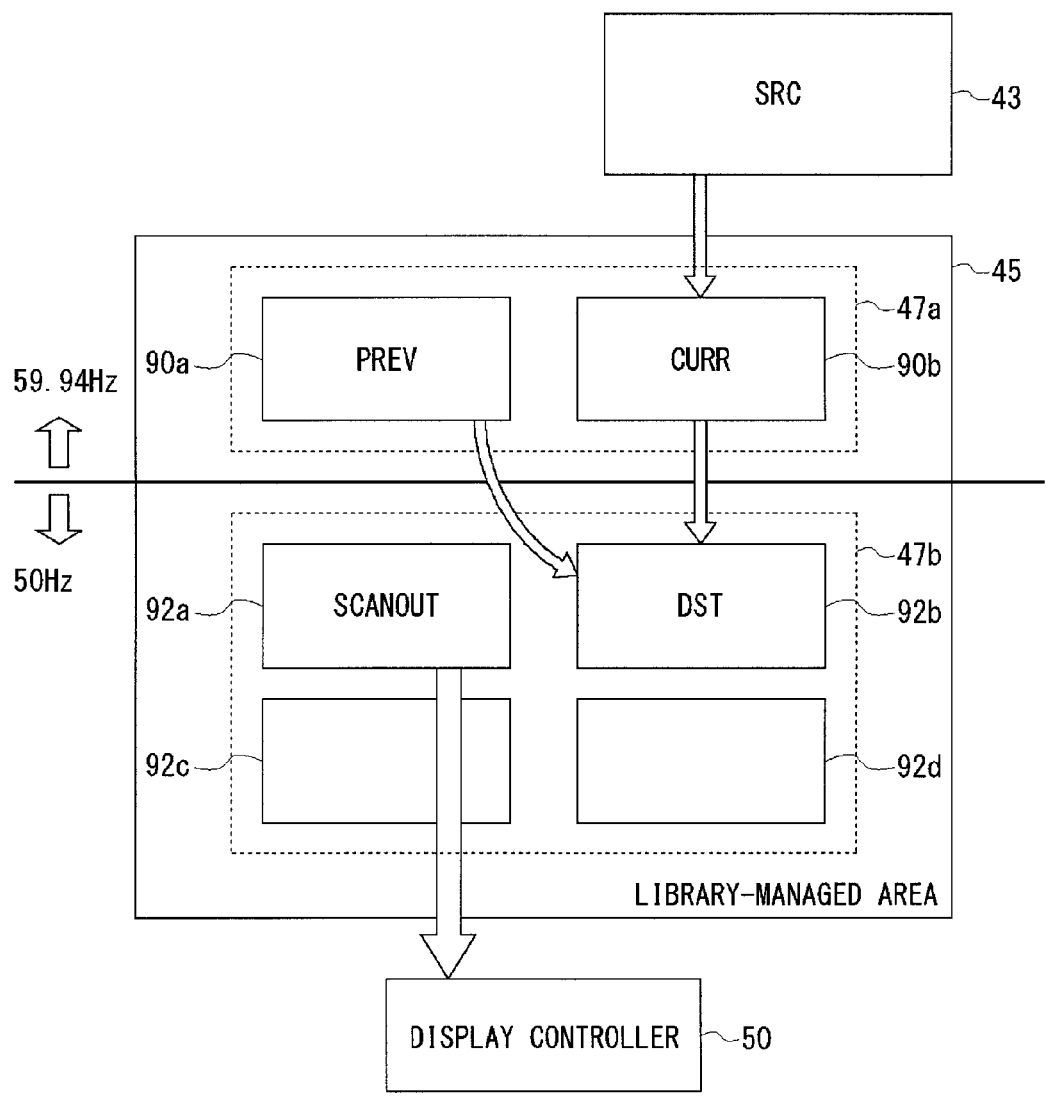
FIG. 5B shows the operation of the image converter of FIG. 2 in the frame interpolation mode.

FIGS. 5A and 5B show the operation of the image converter 35 in the frame interpolation mode. FIG. 5A shows how the image converter 35 subjects an odd frame to image conversion, and FIG. 5B shows how the image converter 35 subjects an even frame to image conversion.

The library-managed area 45 includes a first frame memory 47a and a second frame memory 47b. An image is written in the first frame memory 47a at a vertical synchronous frequency assumed by the graphics processor 30 in rendering (hereinafter, referred to as "rendering vertical synchronous frequency"), and an image is scanned out from the second frame memory 47b at an actual vertical synchronous frequency at which the display 60 displays the image (hereinafter, referred to as "display vertical synchronous frequency"). It will be assumed that the rendering vertical synchronous frequency is 59.94 Hz of the NTSC system, and the display vertical synchronous frequency is 50 Hz of the PAL system.

The image converter 35 subjects a source image SRC held in the user-managed buffer 43 to resolution conversion and writes the converted image in the first frame memory 47a. The first frame memory 47a comprises double buffers 90a and 90b in order to hold a current frame CURR and a previous frame PREV. FIG. 5A shows that the left buffer 90a holds the current frame CURR, and the right buffer 90b holds the previous frame PREV. The current frame CURR written by the image converter 35 in the left buffer 90a is used as the previous frame PREV in the next period of the vertical synchronous frequency, as shown in FIG. 5B.

The image converter 35 generates an interpolation image DST by synthesizing the current frame CURR and the previous frame PREV with a given coefficient for synthesis T, and writes the image DST in the second frame memory 47b. The coefficient for synthesis T is a value based on a shift between the rendering vertical synchronizing signal for the graphics processor 30 and the display vertical synchronizing signal for the display 60. The coefficient varies between 0 and 1. The frame interpolation process is "alpha blending", whereby two frames are synthesized, using the coefficient for synthesis T as an alpha value, and can be performed by the linear interpolation function of the shader.

If the process of subjecting the source image SRC to resolution conversion and writing the converted image in the first frame memory 47a as the current frame CURR, and the process of reading the current frame CURR and the previous frame PREV from the first frame memory 47a and synthesizing the frames with a coefficient for synthesis T are performed concurrently, a competition occurs between the writing and the reading in the buffer holding the current frame CURR. One approach to avoid a competition is to use a shader capable of multi-pass rendering and perform a two-pass process whereby the writing process and the reading process are assigned to different passes. The overhead incurred in this approach is avoided by using a technology called multi-render target, capable of rendering to a plurality of buffers. The technology allows the two processes to be performed in a single pass of the shader by providing two buffers for writing.

That is, concurrently with subjecting the source image SRC to resolution conversion and writing the converted image in the first frame memory 47a as the current frame CURR, the shader synthesizes the result of subjecting the source image SRC to resolution conversion with the previous frame PREV, and writes the interpolation frame DST in the second frame memory 47b. When the process of converting the source image SRC and generating the current frame CURR involves a complex image process, employing the above approach will be difficult. In this case, however, the conversion from the source image SRC into the current frame CURR only involves resolution conversion, which is simple. Therefore, overhead is eliminated by using the multi-render target technology.

While the image converter 35 is performing frame interpolation and writing the interpolation frame DST in the buffer 92a of the second frame memory 47b, the display controller 50 scans out a frame SCANOUT to be displayed from the other buffer 92b of the second frame memory.

A description will be given of the conversion of an even frame with reference to FIG. 5B. The image converter 35 writes the current frame CURR subjected to resolution conversion in the right buffer 90b of the first frame memory 47a. The image converter 35 synthesizes the current frame CURR held in the right buffer 90b with the previous frame PREV held in the left buffer 90a with a given coefficient for synthesis T, and writes the interpolation frame DST in the buffer 92b of the second frame memory 47b. The display controller 50 scans out a frame SCANOUT to be displayed from the other buffer 92a. In practice, those of the four buffers 92a-92d that are free are used sequentially.

By setting the coefficient for synthesis T to a value commensurate with a shift between the rendering vertical synchronizing signal and the display vertical synchronizing signal, two frames rendered at the rendering vertical synchronous frequency for the graphics processor 30 are subject to frame interpolation and converted into the frames compatible with the display vertical synchronous frequency for the display 60.

In the frame interpolation mode, it is favorable to configure the second frame memory 47b to comprise four buffers 92a-92d. The reason for this will be described later.

A description will now be given of how a shift between vertical synchronizing signals differs according to whether the ratio between the rendering vertical synchronous frequency and the display vertical synchronous frequency is an integer or not an integer.

Figure 6A:
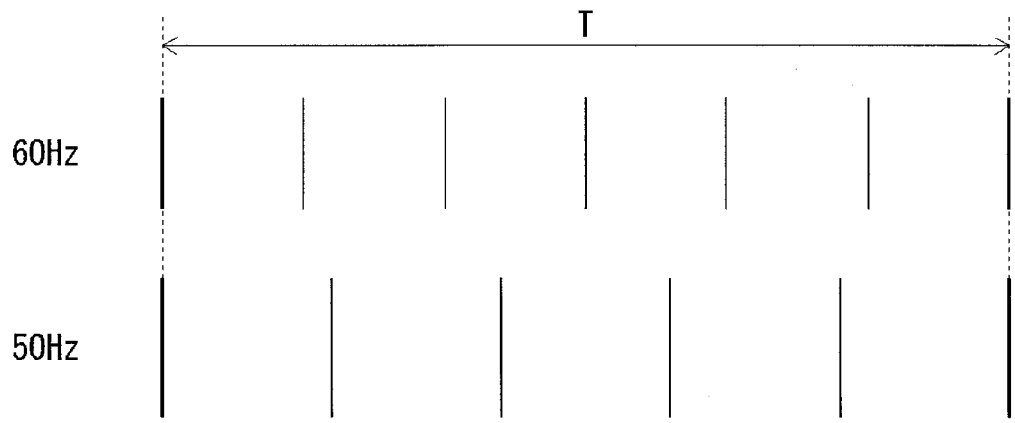
FIGS. 6A and 6B show how a shift between vertical synchronizing signals differs according to whether the ratio between the rendering vertical synchronous frequency and the display vertical synchronous frequency is an integer or not an integer.

FIG. 6A shows the timing of the rendering vertical synchronous frequency of 60 Hz and the display vertical synchronous frequency of 50 Hz. Since the ratio between the rendering vertical synchronous frequency and the display vertical synchronous frequency is 6:5, five display vertical synchronizing signals occur in time T in which six rendering vertical synchronizing signals occur. Accordingly, the rendering vertical synchronizing signal and the display vertical synchronizing signal are synchronized at intervals of T.

Figure 6B:
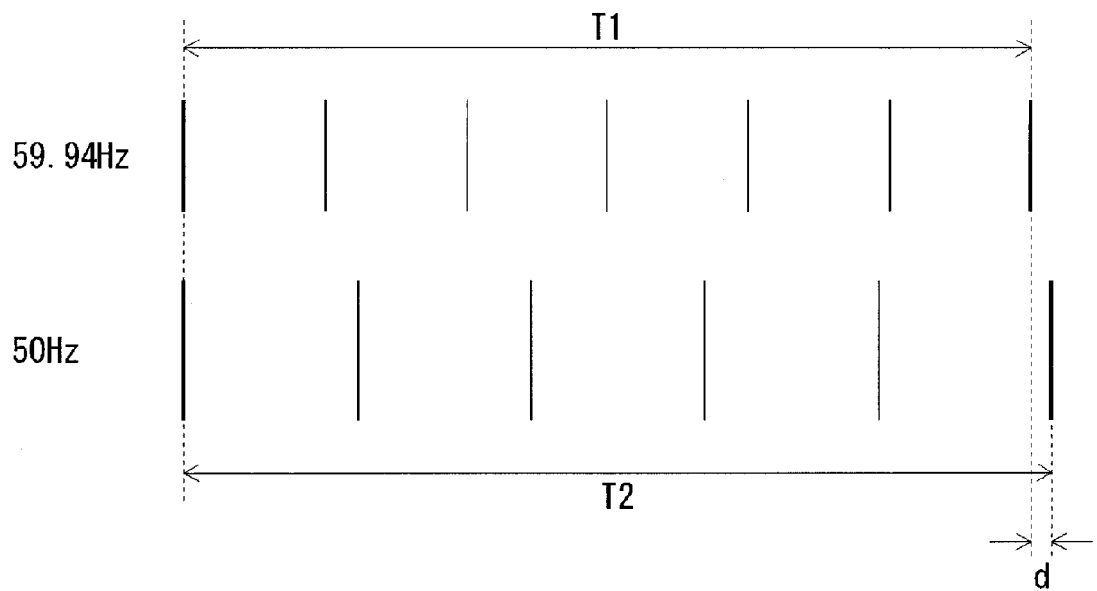

FIG. 6B shows the timing of the rendering vertical synchronous frequency of 59.94 Hz and the display vertical synchronous frequency of 50 Hz. Since the ratio between the rendering vertical synchronous frequency and the display vertical synchronous frequency is not an integer, a small time difference d is created between time T1 in which six rendering vertical synchronizing signals occur and time T2 in which five display vertical synchronizing signals occur. Due to this small time difference d, the rendering vertical synchronizing signals and the display vertical synchronizing signals are not synchronized, and a slight time difference continues to be created. For this reason, the display vertical synchronizing signal at 50 Hz, i.e., the time of scan-out of a frame from a frame buffer, is shifted from the rendering vertical synchronizing signal at 59.9 Hz by an arbitrary amount. The time of starting a scan-out cannot be predefined in relation to the rendering vertical synchronizing signal.

Figure 7A:
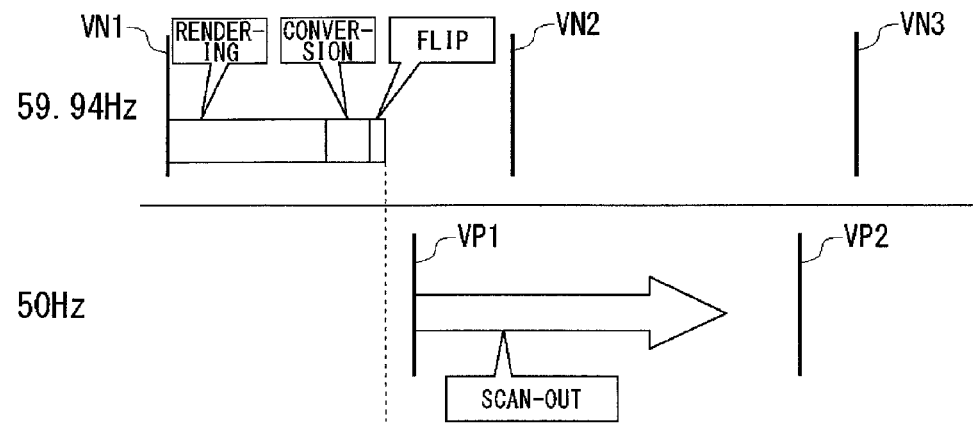
FIGS. 7A and 7B show how the time of scan-out is shifted by one frame when the ratio between the rendering vertical synchronous frequency and the display vertical synchronous frequency is not an integer.
Figure 7B:
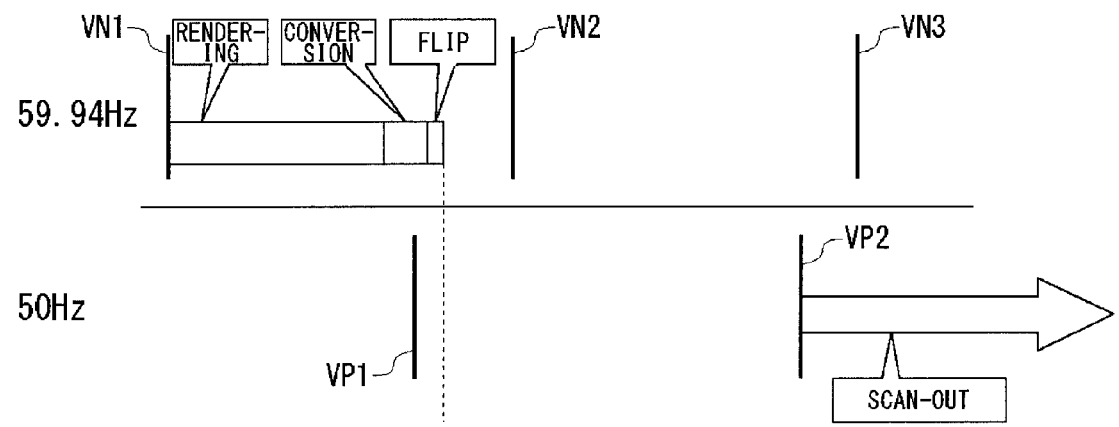

FIGS. 7A and 7B show how the time of scan-out is shifted by one frame when the ratio between the rendering vertical synchronous frequency and the display vertical synchronous frequency is not an integer. The graphics processor 30 executes a rendering command, an image conversion command, and a flip command in succession when each of the rendering vertical synchronizing signals VN1, VN2 and VN3 (hereinafter, referred to as "rendering VSYNCs") occur at 59.9 Hz. The bar charts in the figures indicate the time required for the rendering, image conversion, and flip. Meanwhile, the display controller 50 switches buffers to read from and scans out an image when the display vertical synchronizing signals VP1 and VP2 (hereinafter referred to as "display VSYNCs") occur at 50 Hz.

Referring to FIG. 7A, the time at which the graphics processor 30 completes the rendering, image conversion, and flip precedes the first display VSYNC VP1. Therefore, the scan-out is started when the display VSYNC VP1 occurs.

Referring to FIG. 7B, the graphics processor 30 takes time in rendering so that the time at which the rendering, image conversion, and flip are completed follows the first display VSYNC VP1. Because the scan-out cannot start when the first display VSYNC VP1 occurs, the scan-out has to wait until the second display VSYNC VP2.

Time required by the graphics processor 30 for rendering differs depending on the complexity of a rendering object. Therefore, whether the completion of the rendering and conversion processes precedes the first display VSYNC VP1 or follows that cannot be known in advance. This creates uncertainty in that the scan-out may concur with the first display VSYNC VP1 or the second display VSYNC VP2. If an interpolation frame, produced on the assumption that the frame is scanned out concurrently with the first display VSYNC VP1, is scanned out concurrently with the second display VSYNC VP2, continuity in moving images is lost due to an unsuitable interpolation coefficient, with the result that the image quality is degraded.

Even given that the time required by the graphics processor 30 for rendering remains constant, the slight shift of the display VSYNC at 50 Hz from the rendering VSYNC at 59.94 Hz will be accumulated over time, until a flip command is no longer executed prior to the display VSYNC VP1 but is eventually executed after the VSYNC VP1.

Thus, the time of the flip operation, i.e., time of switching buffers to read from, will be uncertain due to the fact that the time required for rendering is irregular and the fact that the rendering vertical synchronous frequency and the display vertical synchronous frequency are not in an integral ratio.

In order to avoid uncertainty in the flip operation, a flip command according to the embodiment is not executed immediately after a rendering process and an image conversion process are completed. Execution of a flip command is dissociated from a rendering process and an image conversion process, and is executed at a predefined point of time.

Figure 8:
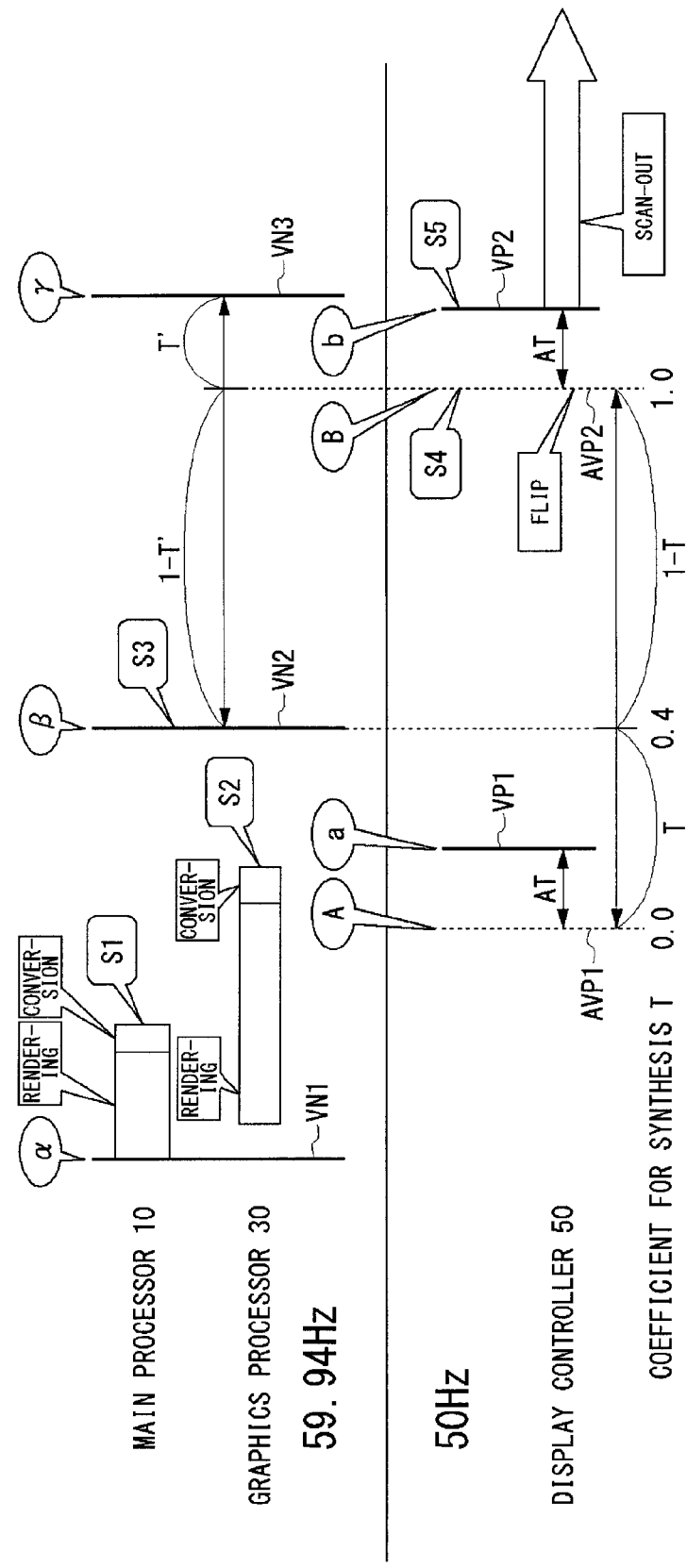
FIG. 8 shows how the execution of a flip command is timed according to the embodiment.

FIG. 8 shows how the execution of a flip command is timed according to the embodiment. The main processor 10 and the graphics processor 30 performs rendering at the rendering vertical synchronous frequency of 59.94 Hz. That is, the rendering is started when the rendering VSYNCs VN-VN3 occur. The display controller 50 performs a scan-out operation at the display vertical synchronous frequency of 50 Hz. That is, the controller 50 switches buffers to read from, and starts a scan-out operation accordingly concurrently with the display VSYNCs VP1 and VP2.

The main processor 10 generates a rendering command and an image conversion command at a time a of the rendering VSYNC VN1 (step S1). The main processor 10 assumes a timing position of a rendering VSYNC (hereinafter, referred to as "target VSYNC") by which the rendering process and the image conversion process by the graphics processor 30 are expected to be completed. In this case, the second rendering VSYNC VN2 is assumed to be a target VSYNC, so that it is assumed that rendering and conversion processes will be completed by a timing position β of the target VSYNC VN2.

Subsequently, the main processor 10 obtains timing positions of the display VSYNC (hereinafter, referred to as "immediately following VSYNC") which occurs immediately after the timing position β of the target VSYNC VN2, and of the display VSYNC (hereinafter, referred to as "immediately preceding VSYNC") which occurs immediately before the timing position β of the target VSYNC VN2. In this case, the immediately following VSYNC is the second display VSYNC VP2 and the immediately preceding VSYNC is the first display VSYNC VP1.

An anticipatory VSYNC is defined at a timing position which precedes a display VSYNC by a predefined anticipatory time AT. An immediately following anticipatory VSYNC AVP2 is defined to precede a timing position b of the immediately following VSYNC VP2 by an anticipatory time AT, and an immediately preceding anticipatory VSYNC AVP1 is defined to precede a timing position a of the immediately preceding VSYNC VP1 by an anticipatory time AT.

The main processor 10 determines a coefficient for synthesis T for frame interpolation based on the degree of shift of the timing position β of the target VSYNC VN2 from the timing position B of the immediately following anticipatory VSYNC AVP2 defined for the immediately following VSYNC VP2. More specifically, the processor 10 determines the relative position of the timing position β of the target VSYNC VN2 in a segment sandwiched by the timing position B of the immediately following anticipatory VSYNC AVP2 and the timing position A of the immediately preceding anticipatory VSYNC AVP1. Defining the timing position A of the immediately preceding anticipatory VSYNC AVP1 as 0 and the timing position B of the immediately following anticipatory VSYNC AVP2 as 1, the processor 10 determines the relative position of the timing position β of the target VSYNC VN2 as a value between 0 and 1. The value thus determined is defined as a coefficient for synthesis T. In the figure, the relative position of the timing position β of the target VSYNC VN2 is 0.4 so that the coefficient for synthesis T will be 0.4.

The time between the immediately preceding anticipatory VSYNC AVP1 and the immediately following anticipatory VSYNC VP2 is 20 ms as defined by the display vertical synchronous frequency. Therefore, the coefficient for synthesis T is given by the following expression, given that the immediately following anticipatory VSYNC AVP2 occurs at time TB and the target VSYNC VN2 occurs at time Tβ.

$$T=\{20-(TB-T\beta)\}/20$$

The command generator 12 of the main processor 10 generates an image conversion command 24 based on the coefficient for synthesis T thus obtained. The command generator 12 compiles in a packet 1) values necessary for determining whether a subsequent target VSYNC VN is correctly assumed, and 2) information necessary for a flip. The generator 12 queues the packet in a packet queue.

The rendering processor 32 of the graphics processor 30 performs a rendering process based on the rendering command, and the image converter 35 performs an image conversion process based on the image conversion command (step S2). For ease of understanding, generation of a rendering command and a conversion command by the main processor 10 and the rendering and conversion processes by the graphics processor 30 are illustrated as being executed in the same period of the vertical synchronous frequency. In practice, however, the rendering and conversion commands generated by the main processor 10 generated in a given period of the vertical synchronous frequency are usually executed by the graphics processor 30 in the next period of the vertical synchronous frequency.

The image conversion process performed by the image converter 35 includes resolution conversion and frame rate conversion. The frame rate conversion is performed in the frame interpolation mode. The image converter 35 synthesizes two frames with the coefficient for synthesizes T determined by the main processor 10. More specifically, the converter 35 subjects the previous frame PREV and the current frame CURR to pixel by pixel linear interpolation according to the expression DST=T*PREV+(1−T)*CURR, so as to derive an interpolation frame DST.

The meaning of the above expression for linear interpolation will be described. Inherently, it would be natural to obtain the coefficient for synthesis T for synthesizing two frames in accordance with the relative position of the timing position B of the immediately following anticipatory VSYNC AVP2 in a segment sandwiched by the timing position β of the rendering VSYNC VN2 and the timing position γ of the rendering VSYNC VN3. Given that the timing position B of the immediately following anticipatory VSYNC AVP2 internally divides the segment sandwiched by the timing position β of the rendering VSYNC VN2 and the timing position γ of the rendering VSYNC VN3 into (1−T'):T', as illustrated, the interpolation frame DST is given by interpolation according to the linear interpolation expression DST=T'*PREV+(1−T') *CURR. However, since the period of the rendering VSYNC VN is shorter than the period of the display VSYNC VP, the linear interpolation expression will present a problem. This is because, the immediately following anticipatory VSYNC AVP may not occur between the two rendering VSYNCs VN. For example, given that the rendering VSYNC occurs at 59.94 Hz and the display VSYNC occurs at 50 Hz, such a situation occurs once in every six periods.

Thus, the fact that the period of the display VSYNC is longer than the period of the rendering VSYNC is taken advantage of so that the coefficient for synthesis T is determined in accordance with the timing position β of the target VSYNC VN2 in the segment sandwiched by the timing position A of the immediately preceding anticipatory VSYNC AVP1 and the timing position B of the immediately following anticipatory VSYNC AVP2. In this way, no problem is presented because the target VSYNC VN is always located between the timing positions of the two anticipatory VSYNC AVPs. As illustrated, the timing position β of the target VSYNC VN2 internally divides the segment sandwiched by the timing position A of the immediately preceding anticipatory VSYNC AVP1 and the timing position B of the immediately following anticipatory VSYNC AVP2 into T:(1−T). It will be understood that the coefficient for synthesis T thus obtained is virtually the reciprocal of the inherent coefficient for synthesis T' mentioned above. The linear interpolation expression DST=T*PREV+(1−T)*CURR according to the embodiment is derived from the linear interpolation expression in which the inherent coefficient for synthesis T' is used.

For example, if the coefficient for synthesis T is 1, the color value of a pixel in the interpolation frame is the same as the color value of the corresponding pixel in the immediately preceding frame. If the coefficient for synthesis T is 0, the color value of a pixel in the interpolation frame is the same as the color value of the corresponding pixel in the current frame. If the coefficient for synthesis T is 0.4, the color value of a pixel in the interpolation frame is determined by synthesizing the color value of the corresponding pixel in the immediately preceding frame and the color value of the corresponding pixel in the current frame, giving the values 40% weight and 60% weight, respectively.

The switch instruction issuing unit 14 configures a flip command to be issued at the timing position B of the immediately following anticipatory VSYNC AVP2 instead of immediately after the image conversion process. The timing position b of the immediately following VSYNC VP2 will be referred to as "scan-out time" and the timing position B of the immediately following anticipatory VSYNC AVP2 preceding the scan-out time b by the anticipatory time AT will be referred to as "flip time".

The switch instruction issuing unit 14 supplies a callback to an application so that the flip function is executed at the flip time B, and temporarily puts the process in a sleep state. That is, instead of queuing a flip command in the command buffer, the flip function is called by the system call. The function for causing the driver to perform the flip operation is called at a timing position preceding the scan-out time by the anticipatory time AT. The flip function is called, allowing a margin of the anticipatory time AT before the actual scan-out time, because, if the function is called at the scan-out time, the actual flip operation by the driver will not be performed in time for the scan-out time.

At the timing position β of the target VSYNC VN2, an interrupt process in the 59.9 Hz system is generated (step S3). In the interrupt process, the unmarked packet at the head of the packet queue is referred to so as to verify whether the assumption made in step S1 that the rendering and conversion processes will be completed by the timing position β of the target VSYNC VN2 proves correct. If the assumption proves correct, i.e., if the rendering and conversion processes have actually been completed by the timing position β of the target VSYNC VN2, the packet is marked as being verified. If the assumption proves incorrect, i.e., if the rendering and conversion processes have not been completed by the timing position β of the target VSYNC VN2, it means that a frame is dropped. In this case, an exception handling is performed in which the coefficient for synthesis T is recalculated and frame interpolation is performed again. The exception handling will be described later.

An interrupt process is generated at the timing position (flip time) B of the immediately following anticipatory VSYNC AVP2 (step S4). In the interrupt process, the application process is woken up by a timer and the flip function is called by the system call. More specifically, the packet at the head of the packet queue is referred to. The flip function is immediately executed to process the packet marked as being verified in the interrupt process in step S3 in the 59.94 Hz system. The packet thus processed is removed from the queue. The unmarked packet that went goes is removed from the queue at this point of time and discarded.

After the elapse of the anticipatory time AT, an interrupt process is generated in the 50 Hz system at the timing position (scheduled scan-out time) b of the immediately following VSYNC VP2 (step S5). In this interrupt process, a timer is set to wake up the application process at the timing position of the next anticipatory VSYNC. Concurrently, the actual flip operation is performed so as to switch buffers. The scan-out of the frame image interpolated with the coefficient for synthesis T is started.

With the knowledge of the above-described frame conversion as a background, a description will now be given of why the second frame memory 47b comprises four buffers in the frame interpolation mode. Since the vertical synchronous frequency is higher than the display vertical synchronous frequency, the writing of a frame and the reading of a frame are not synchronized. Because the writing of a frame precedes the reading of a frame, there should be three buffers. The requirement for three buffers is the same as that of the dropped frame mode. Further, since the frame interpolation mode requires calling the flip function, allowing a margin of the anticipatory time AT before the scan-out time, an additional frame should be buffered. This is why the second frame memory should comprise a total of four buffers. If the anticipatory time AT is zero, three buffers will suffice. The anticipatory time AT of 0 will, however, present a problem with the flip operation. Accordingly, it is more suitable to secure the anticipatory time AT and provide four buffers.

A description will now be given, with reference to FIGS. 9A and 9B, of the advantage of not executing a flip command immediately after the image conversion and dissociating the command from the image conversion process.

Referring to FIG. 9A, the rendering and conversion processes by the graphics processor 30 are completed before the first display VSYNC VP1. A flip command is not issued at this point of time. The command is issued at the time which precedes the second display VSYNC VP2 occurring after the rendering VSYNC VN2, which is expected to follow the completion of the image conversion process, by the anticipatory time AT. The scan-out is started concurrently with the second display VSYNC VP2.

As shown in FIG. 9B, even when the rendering process by the graphics processor 30 takes time and the rendering and conversion processes are completed after the first display VSYNC VP1, a flip command is issued at the time which precedes the second display VSYNC VP2 by the anticipatory time AT, as in the case of FIG. 9A. Therefore, the scan-out is started concurrently with the second display VSYNC VP2.

Thus, irrespective of whether the point of time of completion of the rendering and conversion processes precedes the first display VSYNC VP1 or follows that, the scan-out is started concurrently with the second display VSYNC VP2. As a result, uncertainty in the flip operation is eliminated.

Figure 10A:
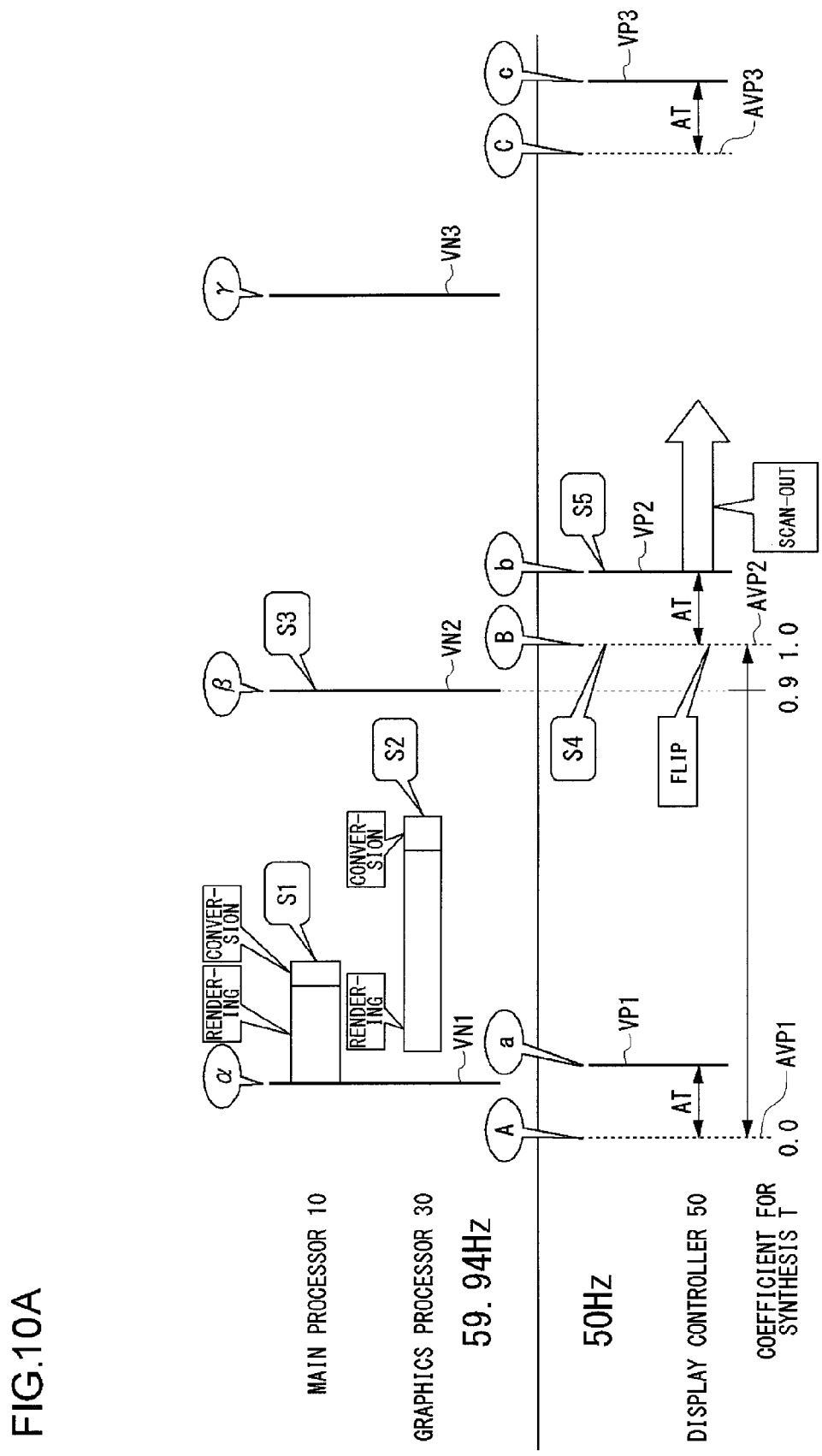
FIG. 10A shows that an image conversion process is actually completed at a time assumed to precede the completion of rendering and conversion processes.

FIG. 8 shows that the timing position β (hereinafter, referred to as "assumed time"), at which the rendering and conversion processes are expected to be completed, is postulated, and that the image conversion process is actually completed before the assumed time β. In case the image conversion process is not completed by the assumed time β, an exception handling is performed in which a feedback is applied so as to correct the subsequent frame interpolation processes. An exception handling will be described with reference to FIGS. 10A, 10B and 10C For comparison, FIG. 10A shows that the image conversion process is actually completed before the assumed time. Steps S1 through S5 are as described with reference to FIG. 8. In this example, the timing position β (assumed time) of the target VSYNC VN2 is located by a distance 0.9 from the start of the segment sandwiched by the timing position A of the immediately preceding anticipatory VSYNC AVP1 and the timing position B of the immediately following anticipatory VSYNC AP2. The coefficient for synthesis T is then set to 0.9. Since the rendering and conversion processes are completed as expected at the assumed time β, a flip command is issued at the flip time B preceding the scan-out time b by the anticipatory time AT. The frame interpolated with the coefficient for synthesis T=0.9 is scanned out at the scan-out time b.

Figure 10B:
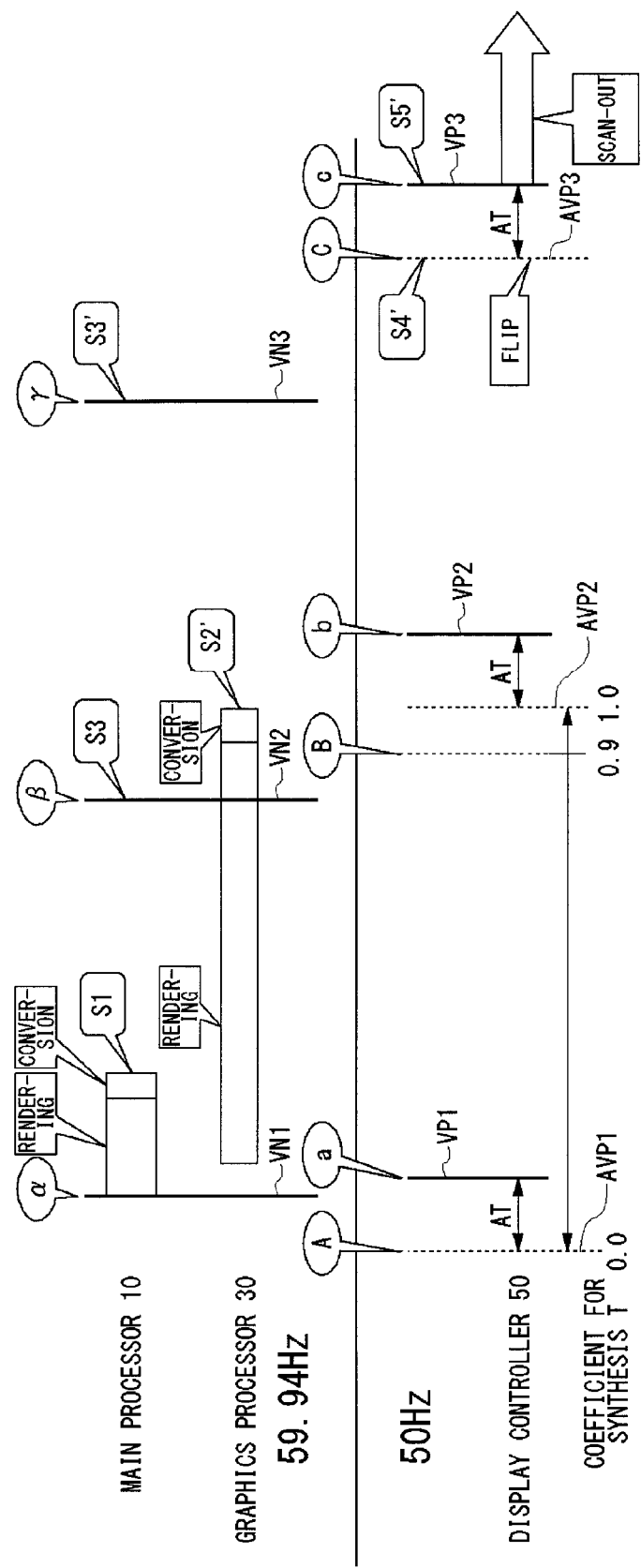
FIG. 10B shows that an image conversion process is not actually completed at a time assumed to precede the completion of rendering and conversion processes.

FIG. 10B shows a transient state in which the image conversion process is not completed at the assumed time. As shown in the figure, the graphics processor 30 takes time in the rendering process. The interrupt process performed in step S3 at the timing position β determines that the rendering and conversion processes are not completed. In this case, the image converter 35 designates the third rendering VSYNC VN3, which is expected to follow the completion of the rendering and conversion processes, as a new target VSYNC, sets the timing position γ of the target VSYNC VN3 as an assumed time. Meanwhile, the switch instruction issuing unit 14 configures a flip command to be issued at a timing position C of the immediately following anticipatory VSYNC AVP3.

Since the rendering and conversion processes are not completed by the assumed time β, a frame is dropped. In this case, the command generator 12 increments by one a variable I, indicating the frequency of rendering VSYNCs required to process a single rendering command and a conversion command. The initial value of the variable I is 1. The variable I is a sum of 1 and the number of times a dropped frame occurs.

In generating the next rendering and conversion command, the command generator 12 determines a target VSYNC by considering the value of the variable I, and stores the command thus generated in the command buffer 22. While the rendering and conversion commands are normally processed within one VSYNC period, the variable I remains set to 1. For subsequent rendering and conversion commands, the VSYNC ahead in time by one VSYNC period is designated as a target VSYNC. If the variable I is set to 2, it means that two VSYNCs are required to process the rendering and conversion commands. In this case, the VSYNC ahead in time by two VSYNC periods is designated as a target VSYNC, for subsequent rendering and conversion commands.

In implementation, generation of rendering and conversion commands by the main processor 10 is performed prior to the execution of the rendering and conversion commands by the graphics processor 30, the target VSYNC is designated by also considering how many rendering and conversion commands are generated in anticipation of execution. That is, the rendering VSYNC, which is ahead in time by a value derived by multiplying the number of commands generated in anticipation of execution by the value of the variable I, is designated as a target VSYNC.

When the image conversion process is not completed within one VSYNC period and a frame is dropped, the command generator 12 sets a target VSYNC in accordance with the variable I to process the rendering and conversion commands generated subsequently. Therefore, the normal state will soon be resumed in which frame interpolation is performed with a correct coefficient for synthesis T. However, while the normal state is not resumed yet, the rendering and conversion commands generated while the command generator 12 postulates the assumed time β cannot be changed. Thus, frame interpolation is performed by using the coefficient for synthesis T determined by postulating the assumed time β.

As expected, the rendering and conversion processes by the graphics processor 30 are completed by the new assumed time γ (step S2'). At the timing position γ of the target VSYNC VN3, an interrupt process in the 59.94 Hz system is generated (step S3'). In the interrupt process, it is verified whether the assumption that the rendering and conversion processes will be completed by the timing position γ of the target VSYNC VN3 is correct.

At the timing position (flip time) C of the immediately following anticipatory VSYNC AVP3, an interrupt process is generated, and the flip function is called by the system call (step S4'). After the elapse of the anticipatory time AT, and at the timing position (scan-out time) b of the immediately following VSYNC VP3, an interrupt in the 50 Hz system is generated. The flip operation is actually performed, buffers are switched, and the frame image interpolated with the coefficient for synthesis T=0.9 is started to be scanned out (step S5').

Thus, when the rendering and conversion processes are not completed within one VSYNC period and require two VSYNC periods, the scan-out will be shifted in time, and the frame interpolated with the coefficient for synthesis T, which is no longer correct, is output. The shift, however, occurs only transiently. If the subsequent rendering and conversion processes require two VSYNC periods regularly, a target VSYNC is set by assuming that two VSYNCs are required for the processes. The coefficient for synthesis T is correctly calculated so that the normal state is resumed. In implementation, since the rendering and conversion commands are generated in anticipation of execution, a transient state will persist until the rendering and conversion commands already generated have been completely processed.

Figure 10C:
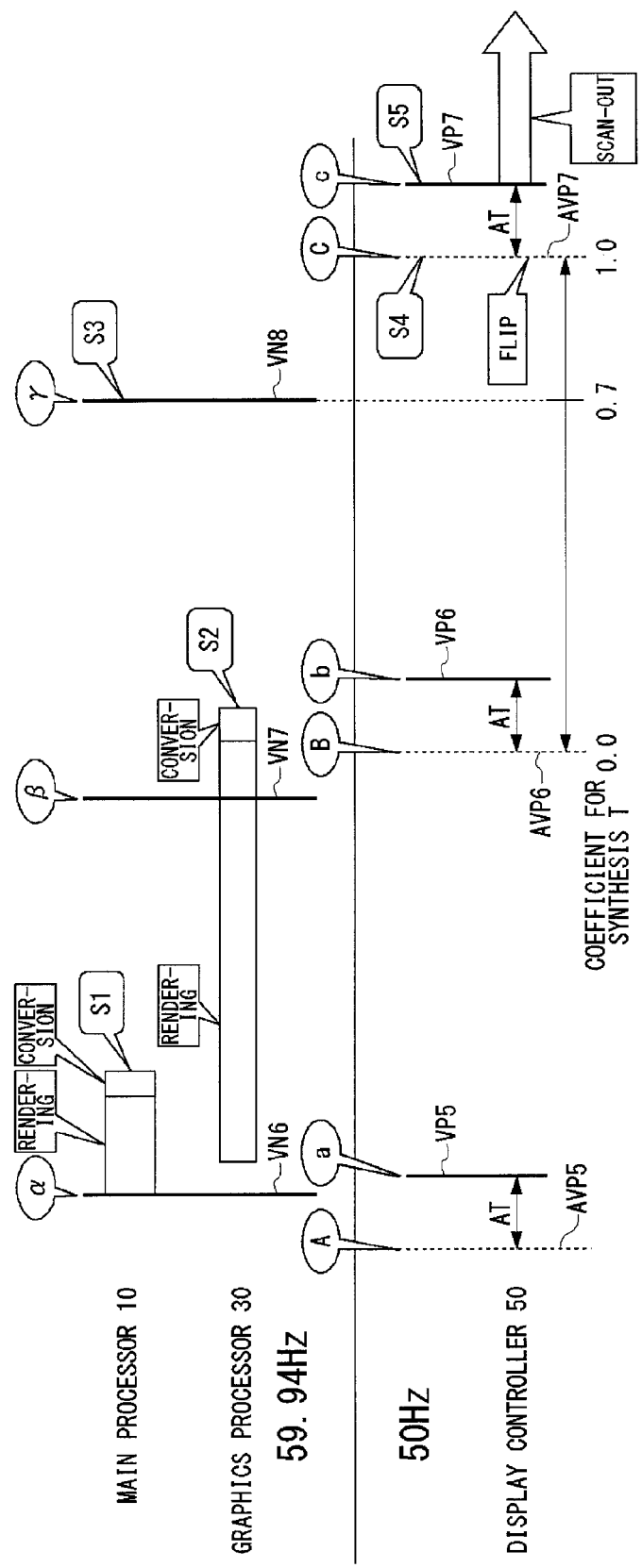
FIG. 10C shows how a normal state is resumed after the transient state of FIG. 10B.

FIG. 10C shows how the normal state is resumed after the transient state of FIG. 10B. FIG. 10C shows that the rendering and conversion processes constantly require two VSYNCs.

The command generator 12 generates a rendering command and a conversion command at the timing position a of the rendering VSYNC VN6 (step S1). At this point of time, the variable I is set to 2 so that the rendering VSYNC VN8 ahead in time by two VSYNCs is designated as a target VSYNC. Subsequently, the command generator 12 defines an immediately preceding anticipatory VSYNC AP6 and an immediately following anticipatory VSYNC AVP7 for the target VSYNC VN8.

Since the timing position (assumed time) γ of the target VSYNC VN8 is located by a distance 0.7 from the start of the segment sandwiched by the timing position B of the immediately preceding anticipatory VSYNC AVP6 and the timing position C of the immediately following anticipatory VSYNC AVP7, the command generator 12 sets the coefficient for synthesis T to 0.7.

After the resolution conversion process (step S2), the image converter 35 synthesizes two frames with the coefficient for synthesis T=0.7, which is set by the command generator 12.

Meanwhile, the switch instruction issuing unit 14 configures a flip command to be issued at the timing position C of the immediately following anticipatory VSYNC AVP7.

As expected, the rendering and conversion processes by the graphics processor 30 are completed by the assumed time γ. At the assumed time γ, an interrupt process in the 59.94 Hz system is generated (step S3).

At the timing position (flip time) C of the immediately following anticipatory VSYNC AVP7, an interrupt process is generated, and the flip function is called by the system call (step S4). At the timing position (scan-out time) c of the immediately following VSYNC VP7, an interrupt in the 50 Hz system is generated. The flip operation is actually performed, the buffers are switched, and the frame image interpolated with the coefficient for synthesis T=0.7 are started to be scanned out (step S5).

Thus, when the rendering and conversion processes regularly require two VSYNCs, the frame is interpolated with the correct coefficient for synthesis T calculated by postulating a target VSYNC which is ahead in time by two VSYNCs. The interpolated frame is scanned out at the right scan-out time.

The exception handling illustrated in FIGS. 10A-10C assumes one of the following two situations; (1) a situation where a frame rate change with a coarse granularity occurs (e.g., a situation where the time required for the rendering process changes from one VSYNC period to two VSYNC periods, and then returns to one VSYNC period after a time); and (2) a dropped frame (e.g., drop of one frame) occurs abruptly.

For example, the situation of (1) is such that, the graphics processor 30 normally renders at 59.94 Hz but begins to render at 29.97 Hz, which is half the frequency of the normal state, due, for example, to an increase in the complexity of a rendered object occurring at a point of time, and such that, after the elapse of a time, the processor 30 is capable of rendering at 59.94 Hz again. The situation of (2) is such that a dropped frame occurs abruptly due, for example, to a temporary overload of the system, but the system returns to the normal state shortly.

With regard to the situation of (1), the transient state described by referring to FIG. 10B occurs immediately after the frequency is switched from 59.94 Hz to 29.97 Hz. As the rendering process is regularly performed at 29.97 Hz, the frame is interpolated with the correct coefficient for synthesis T, which assumes that the rendering requires two VSYNCs. Immediately after the frequency returns from 29.97 Hz to 59.94 Hz, a transient state occurs. Once the rendering is regularly performed at 59.94 Hz, however, the frame is interpolated with the correct coefficient for synthesis T, which assumes that the rendering requires one VSYNC.

With regard to the situation (2), the transient state of FIG. 10B occurs at a point of time when an abrupt drop of frame occurs. In the steady state preceding and following the drop, the frame is interpolated with the correct coefficient for synthesis T.

The frame rate non-conversion mode is described with reference to FIGS. 3A and 3B, the dropped frame mode is described with reference to FIG. 4, and the frame interpolation mode is described with reference to FIGS. 5A-10B.

Substituting the coefficient for synthesis T set to 1 into the linear interpolation expression of the frame interpolation mode DST=T*PREV+(1−T)*CURR, the interpolation frame DST is represented by the previous frame PREV, and substituting the coefficient for synthesis T set to 0 into the expression, the interpolation frame DST is represented by the current frame CURR. When the coefficient for synthesis T is set to 0, the previous frame PREV is not scanned out. When the coefficient for synthesis T is set to 1, the current frame CURR is not scanned out. Thus, the coefficient set to 0 or 1 will produce the same operation as that of the dropped frame mode. The fourth and fifth expanded modes will take advantage of this property.

In the fourth mode, i.e., the slow-operation/dropped frame mode, the image converter 35 normally operates in the frame interpolation mode. When the operation is slow, i.e., when the rendering takes time, the converter 35 substantially operates in the dropped frame mode.

In the normal state, in which the rendering and conversion processes are completed within one VSYNC period, the image converter 35 operates in the frame interpolation mode in which the frame is interpolated with the coefficient for synthesis T determined by calculation. In an exceptionally slow operation, in which the rendering and conversion processes require more than one VSYNC periods, the coefficient for synthesis T is set to 0 or 1 in the frame interpolation mode so that the converter 35 operates substantially in the dropped frame mode.

When the operation is slow, and when the coefficient for synthesis T calculated in the ordinary frame interpolation mode is smaller than 0.5, the coefficient for synthesis T is re-set to 0. When the coefficient for synthesis T is equal to or greater than 0.5, the coefficient T is re-set to 1. The image converter 35 performs linear interpolation with the newly set coefficient for synthesis T (0 or 1). When the coefficient for synthesis T is set to 1, the current frame CURR will be dropped. When the coefficient for synthesis T is set to 0, the previous frame PREV will be dropped.

So long as the image conversion applied to the image rendered by the rendering processor 32 is completed within the period of the vertical synchronous frequency for the graphics processor 30, the converter 35 operates in the frame interpolation mode. While the image conversion process applied to the image rendered by the rendering processor 32 is not completed within the period of the vertical synchronous frequency for the graphics processor 32, the converter 35 substantially switches to the dropped frame mode. So long as the rendering and the image conversion are completed within the interval of vertical synchronizing signals, i.e., one VSYNC, defined by the vertical synchronous frequency assumed by the application, high-quality interpolation images are displayed by using the frame interpolation mode. When the rendering and the image conversion are not completed within one VSYNC, the system substantially switches to the dropped frame mode and implements emergency measures by dropping frames. In a situation in which the rendering and the image conversion are not completed within one VSYNC and a dropped frame occurs, the image quality is often better when frames are dropped rather than when frames are interpolated. The fourth mode, i.e., the slow-operation/dropped frame mode may preferably be adopted in such a situation.

The dropped frame mode and the frame interpolation mode are not an either-or choice. In the fifth mode, i.e., the variable mixture mode, a mode intermediate between the frame interpolation mode and the substantial dropped frame mode is achieved by adjusting the coefficient for synthesis in the frame interpolation mode. A new coefficient for synthesis is defined between the value of the coefficient for synthesis used in the frame interpolation mode and the value of the coefficient for synthesis which virtually drops a frame in the frame interpolation mode. The two images held in the first frame memory are synthesized with the new coefficient for synthesis.

More specifically, the coefficient for synthesis T calculated in the ordinary frame interpolation mode and the value 1 are weighted by a variable mixture ratio R designated by the application so as to determine a new coefficient for synthesis T.

$$T'=R*1.0+(1-R)*T,$$

where R varies between 0 and 1.

The two frames are synthesized with the newly set coefficient for synthesis T' so as to generate the interpolation frame. Setting the mixing ratio R to 1 produces the same behavior as the dropped frame mode in which the previous frame is dropped and the current frame is scanned out. Setting the mixing ratio R to 0 produces the same behavior as the ordinary frame interpolation mode. When the mixing ratio R is an intermediate value between 0 and 1, an intermediate behavior, in which the dropped frame mode and the frame interpolation mode are mixed, results.

In the variable mixture mode, analog control is achieved by allowing the application to adjust the mixing ratio R depending on the situation, with the frame interpolation mode and the drop mode as the extremes of variation. For example, if an object moves significantly and a difference between frames is large, frame interpolation will produce long-lasting afterimages. In this case, the previous frame may be dropped and the current frame may be displayed for better visual experience.

Described above is an explanation of an embodiment of the present invention. The embodiment is intended to be illustrative only and it will be obvious to those skilled in the art that various modifications to constituting elements and processes could be developed and that such modifications are also within the scope of the present invention. Some such modifications will be explained.

In the embodiment, an example where the image rendered at the vertical synchronous frequency of the NTSC system is subject to frame rate conversion and converted into the image having the vertical synchronous frequency of the PAL system. Alternatively, the embodiment is also applicable to a case where the PAL/SECAM system is converted into the NTSC system. The embodiment is equally applicable to a case where the image rendered assuming the vertical synchronous frequency of the NTSC/PAL/SECAM television system is subject to frame rate conversion for compatibility with the vertical synchronous frequency of a computer display, and a case where the image rendered assuming the vertical synchronous frequency of a computer display is subject to frame rate conversion for compatibility with the vertical synchronous frequency of the television system.

The embodiment pertains to the case where the vertical synchronous frequency of the graphics processor 30 and the vertical synchronous frequency of the display 60 are not in an integral ratio. Even if the frequencies are in an integral ratio, the problem of uncertainty in the flip operation will be posed depending on the required duration of the rendering process. The frame rate conversion process of the embodiment will advantageously be applied to such a case as well.

In some embodiments, one or more of the methods and/or techniques described above may be implemented in a computer program executable by a processor based system. By way of example, a processor based system may comprise any type of system having one or more processors, such as the above-described system or similar system, a computer, DVD player, Blu-ray disc player, entertainment system, game console, etc. Such computer program may be used for executing various steps and/or features of the above-described methods and/or techniques. In some embodiments, software modules within the computer program may be used for executing various steps and/or features of the above-described methods and/or techniques.

For example, a computer program in accordance with one embodiment of the present invention may comprise four modules. The first module holds an image rendered by a graphics processor at a given vertical synchronous frequency in a first frame memory. The second module converts an image held in the first frame memory into an image compatible with the specification of a display. The third module holds the image converted by the image converting module in a second frame memory provided with a plurality of switchable frame buffers, with one of the frame buffers being selected in accordance with the vertical synchronous frequency of the display to scan out the image. The fourth module issues a frame buffer switch instruction for designating a frame buffer to scan out from, in synchronization with the vertical synchronous frequency of the display, instead of immediately after the execution of an image converting process by the image converting module.

Such computer program may be stored or embodied in any type of computer readable storage or recording medium. By way of example, such computer readable storage medium may include, but is not limited to, any type of computer memory or storage, such as main memory, local memory, ROM, RAM, mass storage, hard disk drive, network storage, USB storage, Blu-ray disc, digital video disk (DVD), compact disk (CD), floppy disk, etc.

What is claimed is:

1. An image converting apparatus comprising:
   a first frame memory, which holds an image rendered through an image rendering process performed by a graphics processor at a given vertical synchronous frequency;
   an image converter, which performs an image conversion process on the image held in the first frame memory into an image compatible with the specification of a display;
   a second frame memory, which holds the image converted by the image converter by switching a plurality of frame buffers, one of the frame buffers being selected in accordance with a vertical synchronous frequency of the display to scan out the image; and
   a switch instruction issuing unit, which issues a frame buffer switch instruction for designating a frame buffer to scan out from subsequently, in synchronization with the vertical synchronous frequency of the display, instead of immediately after the execution of an image converting process by the image converter, the timing of the switch instruction based on the timing of the vertical synchronous frequency of the display so as to be disassociated from the timing of the image rendering process and the timing of image conversion process, wherein
   the image converter converts the frame rate of the image rendered by the graphics processor to be compatible with the specification of the display, by synthesizing two images held in the first frame memory with a coefficient for synthesis based on a time difference between an assumed vertical synchronizing signal for the graphics processor expected to follow the completion of an image converting process applied to the image rendered by the graphics processor, and a vertical synchronizing signal for the display occurring immediately after the assumed vertical synchronizing signal.

2. The image converting apparatus according to claim 1, wherein
   the vertical synchronous frequency of the graphics processor and the vertical synchronous frequency of the display are not in an integral ratio.

3. The image converting apparatus according to claim 1, wherein
   an image converting process by the image converter includes a process of converting at least one of the resolution and frame rate of the image rendered by the graphics processor to be compatible with the specification of the display.

4. The image converting apparatus according to claim 1, wherein
the image converter converts the frame rate of the image rendered by the graphics processor to be compatible with the specification of the display, by synthesizing two images held in the first frame memory with a coefficient for synthesis based on a timing difference between a vertical synchronizing signal for the graphics processor and a vertical synchronizing signal for the display.

5. The image converting apparatus according to claim 1, wherein
the switch instruction issuing unit issues the frame buffer switch instruction in synchronization with a vertical synchronizing signal for the display occurring immediately after the assumed vertical synchronizing signal.

6. The image converting apparatus according to claim 1, wherein
the switch instruction issuing unit issues the frame buffer switch instruction, allowing a margin of a given time before a vertical synchronizing signal for the display.

7. The image converting apparatus according to claim 5, wherein
the switch instruction issuing unit issues the frame buffer switch instruction, allowing a margin of a given time before a vertical synchronizing signal for the display.

8. An image converting apparatus comprising:
a first frame memory, which holds an image rendered by a graphics processor at a given vertical synchronous frequency;
an image converter, which converts the image held in the first frame memory into an image compatible with the specification of a display;
a second frame memory, which holds the image converted by the image converter by switching a plurality of frame buffers, one of the frame buffers being selected in accordance with a vertical synchronous frequency of the display to scan out the image; and
a switch instruction issuing unit, which issues a frame buffer switch instruction for designating a frame buffer to scan out from subsequently, in synchronization with the vertical synchronous frequency of the display, instead of immediately after the execution of an image converting process by the image converter, wherein
the image converter converts the frame rate of the image rendered by the graphics processor to be compatible with the specification of the display, by synthesizing two images held in the first frame memory with a coefficient for synthesis based on a time difference between an assumed vertical synchronizing signal for the graphics processor expected to follow the completion of an image converting process applied to the image rendered by the graphics processor, and a vertical synchronizing signal for the display occurring immediately after the assumed vertical synchronizing signal,
wherein, when the image converting process is not completed before the assumed vertical synchronous signal, a vertical synchronizing signal for the graphics processor expected to follow the completion of the image converting process is set as a new assumed vertical synchronizing signal for the subsequent process of image conversion, and
wherein the image converter synthesizes two images held in the first frame memory with a coefficient for synthesis based on a timing difference between the new assumed vertical synchronizing signal and a vertical synchronizing signal for the display occurring immediately after the assumed vertical synchronizing signal.

9. The image converting apparatus according to claim 8, wherein
the switch instruction issuing unit issues the frame buffer switch instruction in synchronization with a vertical synchronizing signal for the display occurring immediately after the new assumed vertical synchronizing signal.

10. The image converting apparatus according to claim 9, wherein
the switch instruction issuing unit issues the frame buffer switch instruction, allowing a margin of a given time before a vertical synchronizing signal for the display.

11. An image converting apparatus comprising:
a first frame memory, which holds an image rendered by a graphics processor at a given vertical synchronous frequency;
an image converter, which converts the image held in the first frame memory into an image compatible with the specification of a display;
a second frame memory, which holds the image converted by the image converter by switching a plurality of frame buffers, one of the frame buffers being selected in accordance with a vertical synchronous frequency of the display to scan out the image; and
a switch instruction issuing unit, which issues a frame buffer switch instruction for designating a frame buffer to scan out from subsequently, in synchronization with the vertical synchronous frequency of the display, instead of immediately after the execution of an image converting process by the image converter, wherein
the image converter is provided with a frame interpolation mode in which two images held in the first frame memory are synthesized with a given coefficient for synthesis in order to subject the image rendered by the graphics processor to frame rate conversion, the given coefficient for synthesis based on a time difference between an assumed vertical synchronizing signal for the graphics processor expected to follow the completion of an image converting process applied to the image rendered by the graphics processor, and a vertical synchronizing signal for the display occurring immediately after the assumed vertical synchronizing signal,
wherein the image converter operates in the frame interpolation mode using the given coefficient for synthesis so long as the image conversion process applied to the image rendered by the graphics processor is completed within the period of the vertical synchronous frequency of the graphics processor, and
wherein, when the image conversion process applied to the image rendered by the graphics processor is not completed within the period of the vertical synchronous frequency of the graphics processor, the converter changes the coefficient for synthesis to a value which will substantially drop one of the two images, and then operate in the frame interpolation mode so as to convert the frame rate of the image rendered by the graphics processor to be compatible with the specification of the display.

12. An image converting apparatus comprising:
a first frame memory, which holds an image rendered by a graphics processor at a given vertical synchronous frequency;
an image converter, which converts the image held in the first frame memory into an image compatible with the specification of a display;
a second frame memory, which holds the image converted by the image converter by switching a plurality of frame buffers, one of the frame buffers being selected in accordance with a vertical synchronous frequency of the display to scan out the image; and a switch instruction issuing unit, which issues a frame buffer switch instruction for designating a frame buffer to scan out from subsequently, in synchronization with the vertical synchronous frequency of the display, instead of immediately after the execution of an image converting process by the image converter, wherein the image converter is provided with a frame interpolation mode in which two images held in the first frame memory are synthesized with a given coefficient for synthesis in order to subject the image rendered by the graphics processor to frame rate conversion, the given coefficient for synthesis based on a time difference between an assumed vertical synchronizing signal for the graphics processor expected to follow the completion of an image converting process applied to the image rendered by the graphics processor, and a vertical synchronizing signal for the display occurring immediately after the assumed vertical synchronizing signal, wherein the image converter determines a new coefficient for synthesis intermediate between the value of the coefficient for synthesis used in the frame interpolation mode and the value of the coefficient for synthesis which equivalently drops one of the two images in the frame interpolation mode, and wherein the image converter converts the frame rate of the image rendered by the graphics processor to be compatible with the specification of the display by synthesizing the two images held in the first frame memory with the new coefficient for synthesis.

13. An image converting apparatus for converting an image rendered by a graphics processor into an image compatible with a television specification, comprising:

a first frame memory, which holds an image rendered through an image rendering process performed by the graphics processor at a given vertical synchronous frequency;

an image converter, which performs an image conversion process on the image held in the first frame memory into an image to output that is compatible with a television specification;

a second frame memory, which holds the image converted by the image converter by switching a plurality of frame buffers, one of the frame buffers being selected in accordance with a vertical synchronous frequency of a television display to which the image is output, so as to scan out the image; and a switch instruction issuing unit, which issues a frame buffer switch instruction for designating a frame buffer to scan out from subsequently, in synchronization with the vertical synchronous frequency of the television display to which the image is output, instead of immediately after the execution of an image converting process by the image converter, the timing of the switch instruction based on the timing of the vertical synchronous frequency of the display so as to be disassociated from the timing of the image rendering process and the timing of image conversion process, wherein the image converter converts the frame rate of the image rendered by the graphics processor to be compatible with the television specification, by synthesizing two images held in the first frame memory with a coefficient for synthesis based on a time difference between an assumed vertical synchronizing signal for the graphics processor expected to follow the completion of an image converting process applied to the image rendered by the graphics processor, and a vertical synchronizing signal for the television display occurring immediately after the assumed vertical synchronizing signal.

14. The image converting apparatus according to claim 13, wherein the vertical synchronous frequency of the graphics processor is a vertical synchronous frequency of a specific television specification, and the vertical synchronous frequency of the television display to output to is a frequency other than that of the specific television specification.

15. An image converting method comprising:

holding an image rendered through an image rendering process performed by a graphics processor at a given vertical synchronous frequency in a first frame memory;

performing an image conversion process on an image held in the first frame memory into an image compatible with the specification of a display;

holding the image converted by the converting in a second frame memory provided with a plurality of switchable frame buffers, one of the frame buffers being selected in accordance with a vertical synchronous frequency of the display to scan out the image; and issuing a frame buffer switch instruction for designating a frame buffer to scan out from subsequently, in synchronization with the vertical synchronous frequency of the display, instead of immediately after the execution of an image converting process in the image converting, the timing of the switch instruction based on the timing of the vertical synchronous frequency of the display so as to be disassociated from the timing of the image rendering process and the timing of image conversion process, wherein the converting of an image includes the converting of the frame rate of the image rendered by the graphics processor to be compatible with the specification of the display, by synthesizing two images held in the first frame memory with a coefficient for synthesis based on a time difference between an assumed vertical synchronizing signal for the graphics processor expected to follow the completion of an image converting process applied to the image rendered by the graphics processor, and a vertical synchronizing signal for the display occurring immediately after the assumed vertical synchronizing signal.

16. A non-transitory computer readable storage medium storing a computer program executable by a processor based system, the computer program comprising:

a module, which holds an image rendered through an image rendering process performed by a graphics processor at a given vertical synchronous frequency in a first frame memory;

a module, which performs an image conversion process on an image held in the first frame memory into an image compatible with the specification of a display;

a module, which holds the image converted by the image converting module in a second frame memory provided with a plurality of switchable frame buffers, one of the frame buffers being selected in accordance with a vertical synchronous frequency of the display to scan out the image; and a module, which issues a frame buffer switch instruction for designating a frame buffer to scan out from, in synchronization with the vertical synchronous frequency of the display, instead of immediately after the execution of an image converting process by the image converting module, the timing of the switch instruction based on the timing of the vertical synchronous frequency of the display so as to be disassociated from the timing of the image rendering process and the timing of image conversion process, wherein the module for converting converts the frame rate of the image rendered by the graphics processor to be compatible with the specification of the display, by synthesizing two images held in the first frame memory with a coefficient for synthesis based on a time difference between an assumed vertical synchronizing signal for the graphics processor expected to follow the completion of an image converting process applied to the image rendered by the graphics processor, and a vertical synchronizing signal for the display occurring immediately after the assumed vertical synchronizing signal.

* * * * *